United States Patent
Wilkinson et al.

(10) Patent No.: US 12,242,860 B2
(45) Date of Patent: Mar. 4, 2025

(54) RESET OF A MULTI-NODE SYSTEM

(71) Applicant: Graphcore Limited, Bristol (GB)

(72) Inventors: Daniel John Pelham Wilkinson, Bristol (GB); Bjorn Dag Johnsen, Oslo (NO)

(73) Assignee: GRAPHCORE LIMITED, Bristol (GB)

( * ) Notice: Subject to any disclaimer, the term of this patent is extended or adjusted under 35 U.S.C. 154(b) by 91 days.

(21) Appl. No.: 18/172,661

(22) Filed: Feb. 22, 2023

(65) Prior Publication Data
US 2023/0281018 A1 Sep. 7, 2023

(30) Foreign Application Priority Data

Mar. 1, 2022 (GB) ..................................... 2202815

(51) Int. Cl.
*G06F 9/4401* (2018.01)
*G06F 9/52* (2006.01)

(52) U.S. Cl.
CPC ............ *G06F 9/4418* (2013.01); *G06F 9/522* (2013.01)

(58) Field of Classification Search
CPC .... G06F 9/4418; G06F 9/522; G06F 2201/86; G06F 11/00; G06F 11/1417; G06F 11/1441; G06F 11/1471; G06F 15/17325
See application file for complete search history.

(56) References Cited

U.S. PATENT DOCUMENTS

| | | | | |
|---|---|---|---|---|
| 4,381,525 A | * | 4/1983 | Senoo | G11B 20/10527 360/32 |
| 5,884,021 A | * | 3/1999 | Hirayama | G06F 11/1407 714/13 |
| 5,994,934 A | * | 11/1999 | Yoshimura | H03L 7/0891 327/158 |
| 6,049,817 A | * | 4/2000 | Schoen | G06F 8/458 718/102 |
| 6,606,702 B1 | * | 8/2003 | Guthrie | G06F 9/3842 712/30 |
| 7,069,407 B1 | * | 6/2006 | Vasudevan | H04L 49/30 709/236 |

(Continued)

FOREIGN PATENT DOCUMENTS

| | | |
|---|---|---|
| JP | H1049461 A | 2/1998 |
| WO | 2022015775 A1 | 1/2022 |

OTHER PUBLICATIONS

Search Report dated Nov. 4, 2022 for United Kingdom Patent Application No. GB22202815.3. 4 pages.

*Primary Examiner* — Faisal M Zaman
(74) *Attorney, Agent, or Firm* — HAYNES AND BOONE, LLP

(57) ABSTRACT

Each of the nodes stores a number, referred to herein as a generation number, which is updated whenever the respective node undergoes a reset and restart from checkpoint. Since the nodes of the system participate in the same reset event, at most times, each generation number held by a node will be the same across the system. However, in some cases, when one node resets before another node, the generation numbers between those two nodes will differ. The data frames sent between the nodes each comprise a generation number of the sending node, which is checked by the recipient and only accepted if the generation number in the frames matches the generation number of the recipient node.

18 Claims, 25 Drawing Sheets

(56) References Cited

U.S. PATENT DOCUMENTS

| | | | |
|---|---|---|---|
| 9,825,865 B1* | 11/2017 | Sharma | H04L 47/125 |
| 10,915,488 B2* | 2/2021 | Dupont De Dinechin | ............... G06F 9/52 |
| 2007/0005819 A1* | 1/2007 | Skirvin | G06F 13/387 710/8 |
| 2014/0325274 A1* | 10/2014 | Mueller | G06F 11/1441 714/23 |
| 2014/0344831 A1* | 11/2014 | Levine | G06F 11/3404 718/107 |
| 2016/0011996 A1 | 1/2016 | Asaad | |
| 2016/0072883 A1* | 3/2016 | Long | G06F 11/00 709/219 |
| 2017/0177046 A1* | 6/2017 | Garg | G06F 1/3243 |
| 2019/0121638 A1* | 4/2019 | Knowles | G06F 9/30087 |
| 2019/0121785 A1* | 4/2019 | Wilkinson | G06F 15/80 |
| 2020/0319974 A1 | 10/2020 | Lacey | |
| 2022/0021512 A1* | 1/2022 | Vickers | G06F 9/546 |

\* cited by examiner

Figure 6

RESET OF A MULTI-NODE SYSTEM

CROSS-REFERENCE TO RELATED APPLICATIONS

The present application claims priority to United Kingdom Patent Application No. GB2202815.3 filed Mar. 1, 2022, the disclosure of which is hereby incorporated herein by reference in its entirety.

TECHNICAL FIELD

The present disclosure relates to a processing system configured to support an application, and in particular to processing system comprising a plurality of processing nodes, each of which comprises a processing unit configured to execute a set of instructions for part of the application.

BACKGROUND

In the context of processing data for complex or high-volume applications, a processing unit for performing the processing of that data may be provided. The processing unit may function as a work accelerator to which the processing of certain data is offloaded from a host system. Such a processing unit may have specialised hardware for performing specific types of processing. For example, a processing unit adapted for machine learning may include a large number of processors tiles implemented together on the same chip, so as to provide for a large degree of parallelism supported by the same processors. To support the operation of such a processing unit, additional system on chip (SoC) circuitry may be provided together with the processing unit on the same chip. Such SoC circuitry may include, for example, on-chip memory independent of the memory of the processors, port controllers for external communication, boot hardware for booting the processing units.

In order to extend the processing volume to enable the support of larger applications, multiple processing units may be connected together to form a larger system. In various implementations of such a processing system, each of the chips supporting these processing units are connected together via high-speed links enabling communication between the tile processors of the different processing units.

During processing of an application supported across a system of connected chips, various error events may occur on one or more of these chips. Common events include, for example, an over temperature condition, occurrence of an uncorrectable memory error, failure of an external link of a device. Some of the error events may require a reset of the system and restart of the application running of the system from a checkpoint.

SUMMARY

When performing a reset of a multi-node system, one problem that may be encountered is that if one of the nodes resets and restarts from an earlier checkpoint before another node was undergone reset, the node that has undergone the reset may receive packets from nodes that have not yet reset, where those packets relate to an earlier generation of the application running on the system. This may interfere the application processing relating to the new generation of the application for which the node that has undergone reset is now performing processing.

According to a first aspect, there is provided a processing system configured to support an application, the processing system comprising: a plurality of processing nodes, each of which comprises: a processing unit configured to execute a set of instructions for part of the application; and at least one storage configured to store a copy of a number indicating a number of times a global reset of the processing system has been performed; and reset circuitry configured to cause the respective processing node to be reset as part of one of the global resets for the processing system and application processing by the processing unit of that respective processing node to be restored from a checkpoint, wherein each of the processing nodes comprises circuitry configured to, as part of the reset of the respective processing node, update the copy of the number held in the at least one storage of the respective processing node, wherein the processing unit of a second of the processing nodes is configured to, prior to the reset of the second of the processing nodes, execute its sets of instructions to cause the sending of one or more data frames to a first of the processing nodes, each of the one or more data frames comprising the copy of the number held in the at least one storage of the second of the processing nodes, wherein circuitry of the first of the processing nodes is configured to, following the reset of the first of the processing nodes, and in response to determining a mismatch between the copy of the number in the one or more data frames and the copy of the number held in the at least one storage, cause the one or more data frames to be discarded.

Each of the nodes stores a number, referred to herein as a generation number, which is updated whenever the respective node undergoes a reset and restart from checkpoint. Since the nodes of the system participate in the same reset event, at most times, each generation number held by a node will be the same across the system. However, in some cases, when one node resets before another node, the generation numbers between those two nodes will differ. The data frames sent between the nodes each comprise a generation number of the sending node, which is checked by the recipient and only accepted if the generation number in the frames matches the generation number of the recipient node. If the recipient node resets prior to the reset of the sending node, the generation number in the frames will not match the generation number of the recipient node, and the frames will not be accepted. Therefore, the node that has reset and restarted is protected against packets relating to an earlier generation of the application that are dispatched by a node that has not yet reset.

According to a first aspect, there is provided a processing system configured to support an application, the processing system comprising: a plurality of processing nodes, each of which comprises: a processing unit configured to execute a set of instructions for part of the application; and at least one storage configured to store a copy of a number indicating a number of times a global reset of the processing system has been performed; and reset circuitry configured to cause: the respective processing node to be reset as part of one of the global resets for the processing system; and application state for the part of the application for the respective processing node to be restored from a checkpoint, wherein each of the processing nodes comprises update circuitry configured to, as part of the reset of the respective processing node, update the copy of the number held in the at least one storage of the respective processing node from a first value to a second value, wherein the processing unit of a second of the processing nodes is configured to, prior to the reset of the second of the processing nodes, execute its sets of instructions to cause the sending of one or more data frames to a first of the processing nodes, each of the one or more data frames comprising the first value of the number, wherein circuitry of the first of the processing nodes is configured to, following the reset of the first of the processing nodes, and in response to determining a mismatch between the first value of the number in the one or more data frames and the second value of the number held in the at least one storage of the first of the processing nodes, cause data in the one or more data frames to be discarded.

In some embodiments, for each of the processing nodes, the respective processing unit is configured to participate in a plurality of barrier synchronizations indicated in its set of instructions, wherein for each of the processing nodes, the respective processing unit is configured to, for each of the barrier synchronizations in which it participates, pass the respective barrier synchronization in response to at least one further one of the processing units in the processing system also participating in the respective barrier synchronization.

In some embodiments, for each of the processing nodes, each of the respective plurality of barrier synchronizations separates a compute phase of the respective processing unit from an exchange phase of the respective processing unit.

In some embodiments, the processing unit of the first of the processing nodes is configured to, following the reset of the first of the processing nodes, stall at a first barrier synchronization until a further one of the processing units, which is also arranged to participate in the first barrier synchronization, reaches the first barrier synchronization in its application processing.

In some embodiments, the further one of the processing units is the processing unit of the second of the processing nodes.

In some embodiments, the first barrier synchronization acts as barrier between a compute phase and an exchange phase, wherein the processing unit of the first of the processing nodes is configured to execute its set of application instructions to: perform computations during the compute phase until reaching the first barrier synchronization; and following the first barrier synchronization, exchange data with the second of the processing nodes during the exchange phase, the exchanged data including data contained in the one or more data frames.

In some embodiments, the circuitry of the first of the processing nodes that is configured to determine the mismatch is part of an interface of the first of the processing nodes for interfacing with the second of the processing nodes.

In some embodiments, the interface of the first of the processing nodes is configured to receive further data frames from the second of the processing nodes and, provide data packets encapsulated in the further data frames to the processing unit of the first of the processing nodes.

In some embodiments, the processing unit of the second of the processing nodes is configured to, following the reset of the second of the processing nodes, execute its sets of instructions to cause the sending of one or more further data frames to the first of the processing nodes, each of the one or more further data frames comprising the second value of the number, wherein the circuitry of the first of the processing nodes is configured to receive the one or more further data frames and in response to determining a match between the second value of the number in each of the one or more further data frames and the second value of the number held in the at least one storage of the first of the processing nodes, cause data in the one or more data frames to be accepted.

In some embodiments, the circuitry of the first of the processing nodes is configured to determine the mismatch as part of checking an address field in each the data frames.

In some embodiments, for each of the processing nodes, the respective update circuitry comprises a processor configured to execute computer readable instructions so as to perform the update of the copy of the number held in the at least one storage of the respective processing node.

In some embodiments, the updating the copy of the number comprises incrementing the first value to obtain the second value.

In some embodiments, the copy of the number forms part of connection state for a connection between the first of the processing nodes and the second of the processing nodes.

In some embodiments, each processing node comprises an integrated circuit comprising: the processing unit; and the at least one storage for the respective processing node.

In some embodiments, the processing unit of the second of the processing nodes is configured to execute its set of instructions to output the first value of the number in one or more data packets of the one or more data frames.

In some embodiments, the processing unit of the second of the processing nodes is configured to execute its set of instructions to output data for the one or more data frames to interface circuitry, wherein the interface circuitry is configured to provide the one or more data frames with the first value of the number inserted into each frame.

According to a second aspect there is provided a method comprising: on each of a plurality of processing nodes, executing a set of instructions for part of an application supported by a system comprising the plurality of processing nodes; and storing on each of the processing nodes, a copy of a number indicating a number of times a global reset of the processing system has been performed; performing one of the global resets, including: resetting each of the plurality of processing nodes, including updating, from a first value to a second value, the copies of the number held on each of the processing nodes; and restoring application state for the part of the application for the respective processing node from a checkpoint; prior to the reset of the second of the processing nodes, sending one or more data frames from a second of the processing nodes to a first of the processing nodes, each of the one or more data frames comprising the first value of the number; and following the reset of the first of the processing nodes, and in response to determining a mismatch between the first value of the number in the one or more data frames and the second value of the number held at the first of the processing nodes, causing data in the one or more data frames to be discarded.

According to a third aspect, there is provided a computer program comprising a set of executable instructions for each processing node of a plurality of processing nodes forming a data processing system, wherein each of the sets of executable instructions, when executed by at least one processor of its respective processing node, causes its respective processing node to: support part of a distributed application, the distributed application being supported by the plurality of processing nodes; store a copy of a number indicating a number of times a global reset of the processing system has been performed; and as part of a global reset for the data processing system: resetting the respective processing node, including updating, from a first value to a second value, the copy of the number held on the respective processing node; and restoring application state for the part of the distributed application for the respective processing node from a checkpoint, wherein a second of the sets of executable instruction is configured to, when executed by at least one processor of a second of the processing nodes, cause the second of the processing nodes to, prior to the reset of the second of the processing nodes, send one or more data frames to a first of the processing nodes, each of the one or more data frames comprising the first value of the number; wherein a first of the sets of executable instruction is configured to, when executed by at least one processor of the first of the processing nodes, cause the first of the processing nodes to, following the reset of the first of the processing nodes, in response to determining a mismatch between the first value of the number in the one or more data frames and the second value of the number stored by the first of the processing nodes, discard data in the one or more data frames.

According to a fourth aspect, there is provided a non-transitory computer readable medium storing the computer program according to the third aspect.

BRIEF DESCRIPTION OF DRAWINGS

To aid understanding of the present disclosure and to show how embodiments may be put into effect, reference is made by way of example to the accompanying drawings in which:

FIG. 6 illustrates the structure of a local event vector and a global event vector according to an example embodiment;

DETAILED DESCRIPTION

Figure 1:
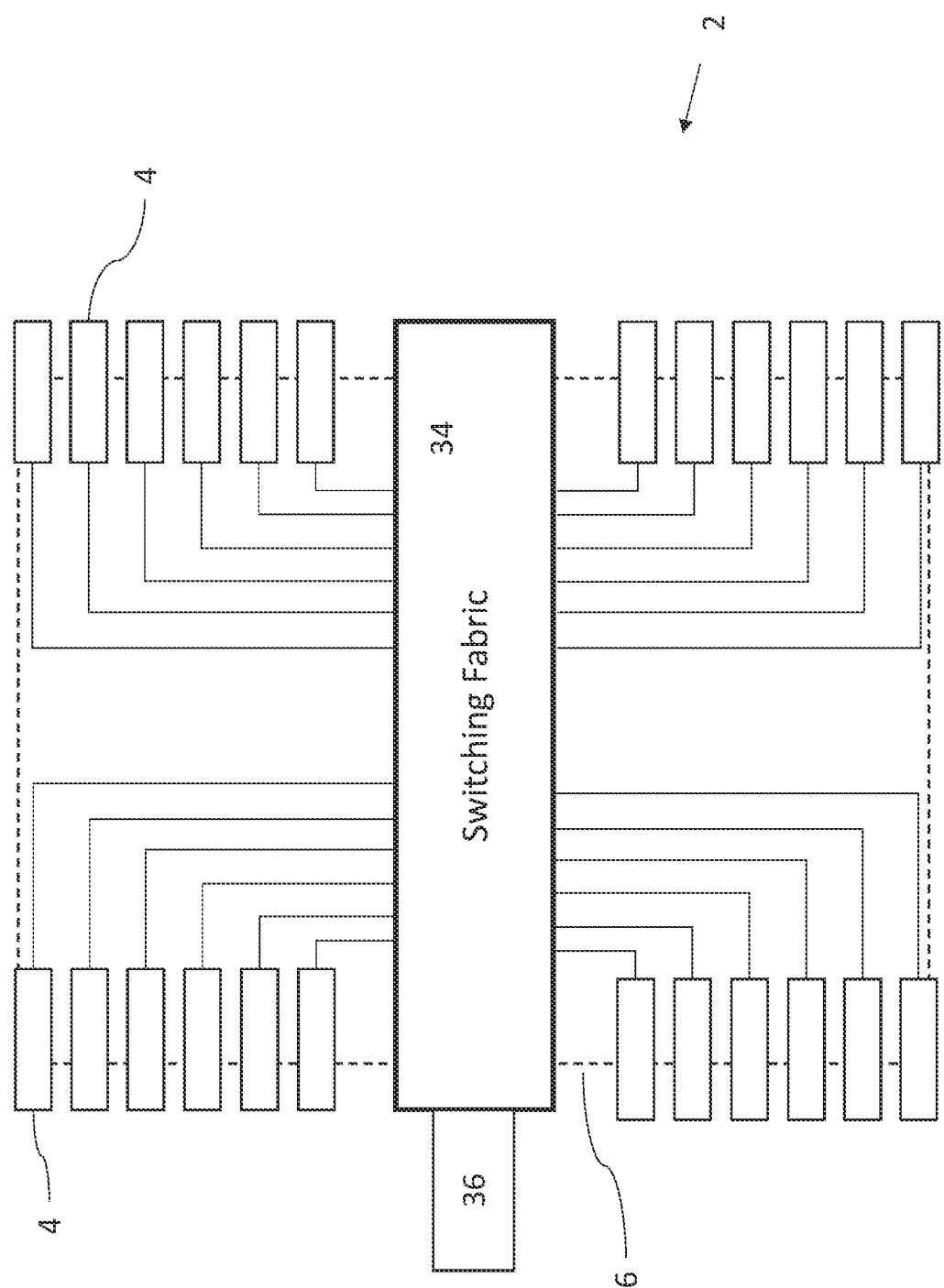
FIG. 1 is a schematic block diagram of a multi-tile processing unit.

Reference is made to FIG. 1, which illustrates an example multi-processing unit 2. The multi-tile processing unit 2 is described in our earlier U.S. application Ser. No. 15/886,065, the contents of which are incorporated by reference. Each of the processing units 2 is formed on a separate integrated circuit (i.e. a chip).

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 is part of a chip that also comprises one or more external links, enabling the processing unit 2 to be connected to one or more other processing units (e.g. one or more other instances of the same processing unit 2). These external links may comprise any one or more of: one or more processing unit-to-host links for connecting the processing unit 2 to a host system, and/or one or more processing unit-to-processing unit links for connecting together with one or more other instances of the processing unit 2 on the same IC package or card, or on different cards. The processing unit 2 receives work from the host, in the form of application data which it processes.

Figure 2:
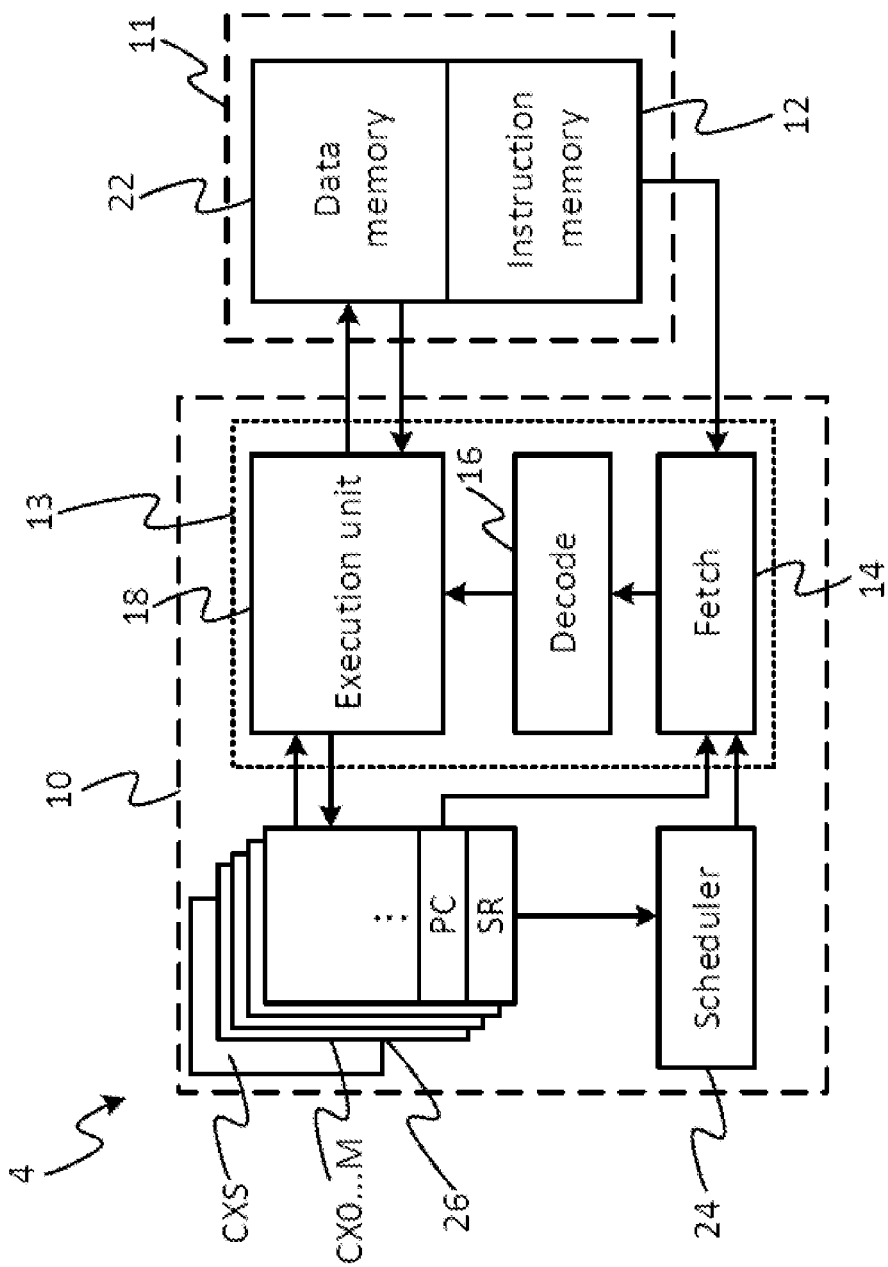
FIG. 2 is a schematic block diagram of one of the tiles that may be implemented in the multi-tile processing unit.

Each of the tiles 4 comprises processing circuitry and memory. In some example embodiments, the processing circuitry is a multi-threaded processor 10. FIG. 2 illustrates an example of a tile 4 in accordance with embodiments of the present disclosure. The tile 4 comprises a multi-threaded processor 10 in the form of a barrel-threaded processor 10, and a local memory 11. A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 3:
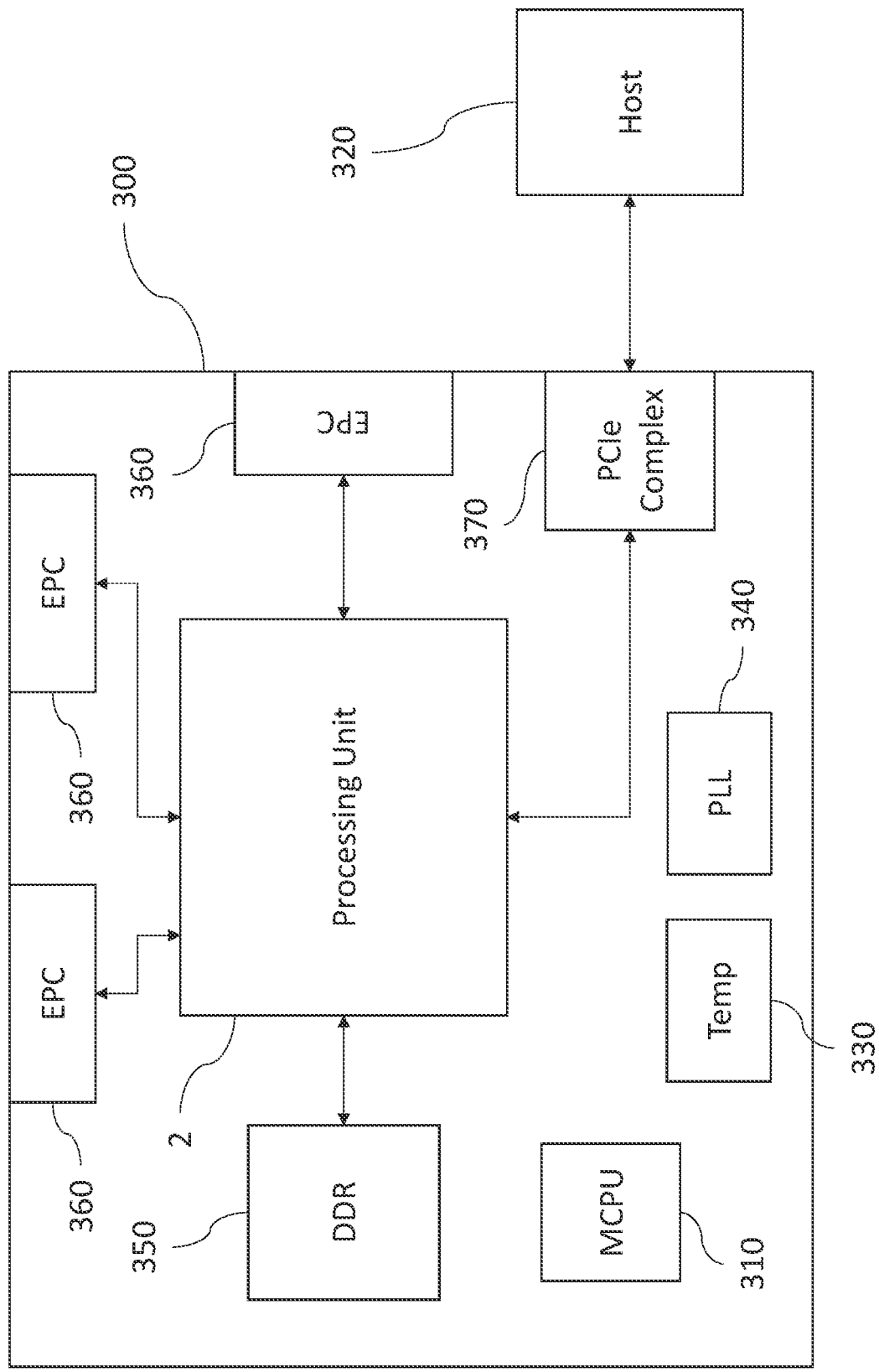
FIG. 3 is a first example embodiment of a processing node.

Reference is made to FIG. 3, which illustrates an example of a processing device 300 including the processing unit 2 discussed above. The processing device 300 constitutes a processing node in a system of such processing nodes. The device 300 is implemented a single integrated circuit, i.e. a chip. The device 300 includes a plurality of components, including the processing unit 2, and also including other system on chip (SoC) components that support the operation of the processing unit 2. The device 300 comprises a management processor 310, referred to as the management CPU (MCPU) 310. The MCPU 310 executes computer readable instructions to support operation of the device 300, e.g. by handling error events, setting up connections. The device 300 also includes a temperature sensor 330 for measuring the temperature of the device 300. The device 300 includes a phase locked loop (PLL) 340 for providing a clock signal for the device 300. The device 300 includes a DRAM module 350 for storing data (e.g. checkpoint data) output by the application code running on the processing unit 2 and/or for provision to the processing unit 2. The device 300 includes a plurality of interface controllers for external communication. These include, for example, an Ethernet Port Controller (EPC) 360. The EPCs 360 are used to tunnel packets over Ethernet between device 300 and other equivalent devices 300 in a multi-node system. The tunnelled packets may be provided to and from the tiles 4 of the processing unit 2 (in the case of data plane traffic) or to and from various components of the device 300 (in the case of control plane traffic). The interface controllers also include a PCIe complex 370 for PCIe communication between the device 300 and a host device 320.

Figure 4:
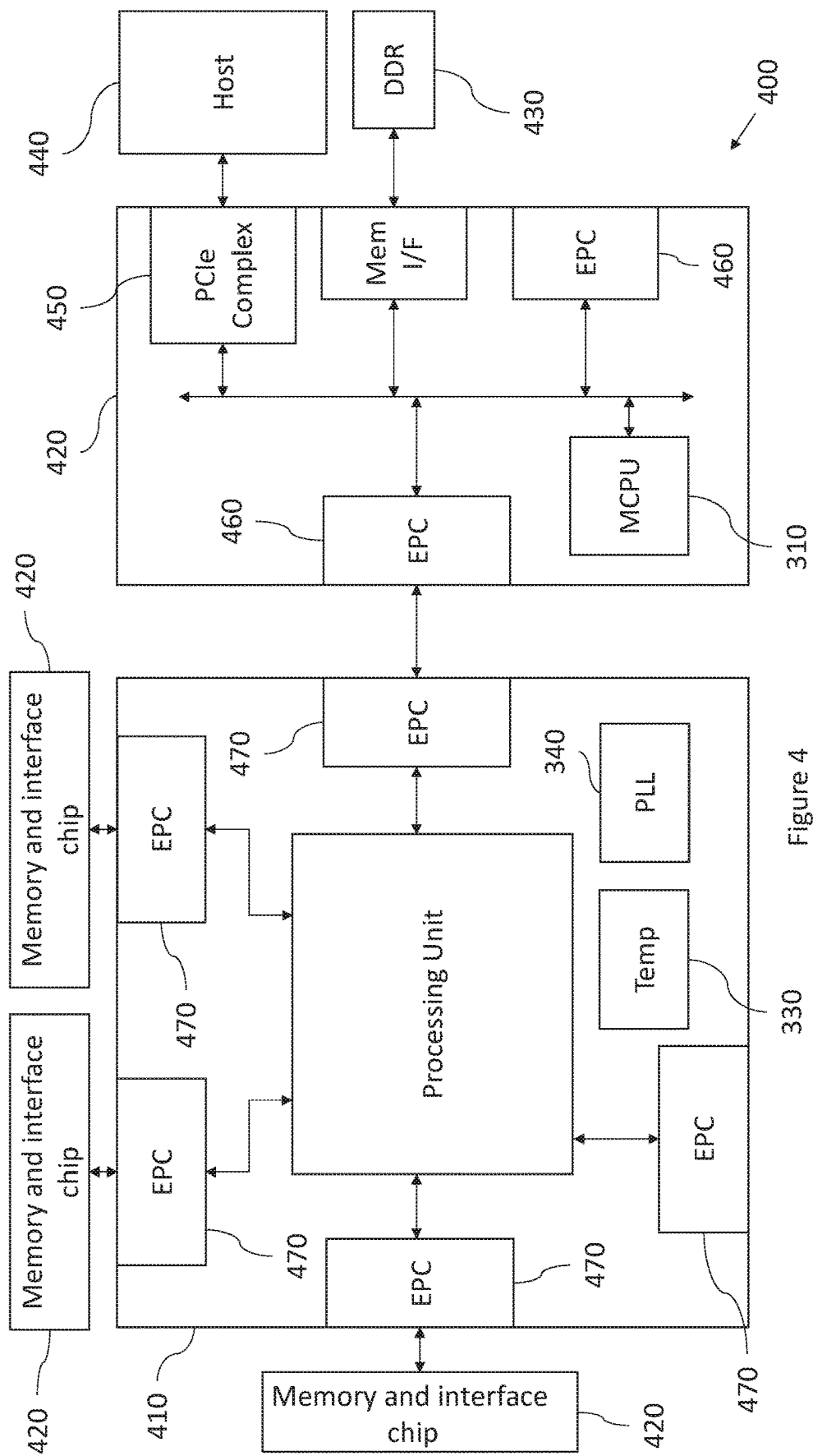
FIG. 4 is a second example embodiment of a processing node.

FIG. 3 represents an example of a processing node 300 implemented on a single chip 300. Reference is made to FIG. 4, which illustrates a processing node 400 comprising a plurality of chips 410, 420. The processing node 400 includes a main processing chip 410 comprising the processing unit 2. The processing node 400 also comprises additional chips 420 associated with and connected to the main processing chip 410. The additional chips 420 may be referred to as fabric chips 420. For simplification, only one of the four fabric chips 420 of the node 400 is shown in detail. Each of the fabric chips 420 provides accesses to DRAM memory 430, which may be read or written to by the processing unit 2. One of the fabric chips 420 provides access to the host device 440 via a PCIe complex 450. Each of the fabric chips 420 includes EPCs 460, one of which is for interfacing with the main processing chip 410 and others of which are for interfacing with other processing nodes that are equivalent to processing node 400. The chip 410 also includes EPCs 470, some of which are for interfacing with the fabric chips 420 belonging to the same node 400 and some of which are for interfacing with fabric chips 420 belonging to different nodes 400. In this embodiments, the MCPU 310 is moved from the main processing chip 410 to the fabric chip 420.

In a particular processing node (either node 300 or node 400), a number of different events may occur that may be indicative of error conditions that have occurred in the processing node. Such events may, for example, be an overtemperature event detected by the temperature sensor 330, an exception event recorded by a tile 4 whilst executing its application code, or occurrence of an uncorrectable error in a DRAM module 350, 430. Some of the error events may be fatal to the application, e.g. a link between chips has gone down, whereas other may not be fatal whilst still requiring reporting, e.g. a number of correctable errors above a threshold amount has occurred on a link. The events for which reporting and aggregation is performed are each assigned to an event classes, which refers to the type of event. For example, an uncorrectable memory error in a DRAM module 350, 430 may be one event class, whereas a security exception may be another event class. In the case of the processing node 400, which comprise multiple chips 410, 420, some of the events may take place on the main processing chip 410, whist others may occur on one of the fabric chips 420.

A system of processing nodes is provided in which each of the processing nodes is configured to execute part of the application code for the entire system. Such a system may be referred to as a partition, since a single isolated application executes across the devices of the system. Each processing node in the system stores at least one copy of an event vector, where each element of that event vector corresponds to a different event class. Each element indicates whether an event of the class to which it corresponds has occurred anywhere in the system of processing nodes. This event vector, which is aggregated across the system, is referred to herein as a global event vector (GEV). In addition to the GEV, each node also stores its own associated local event vector (referred to herein as the 'CEV'). The CEV also comprises a plurality of elements, where each of those elements indicate whether an event of a corresponding event class has occurred on the processing node storing that local event vector.

Figure 6:
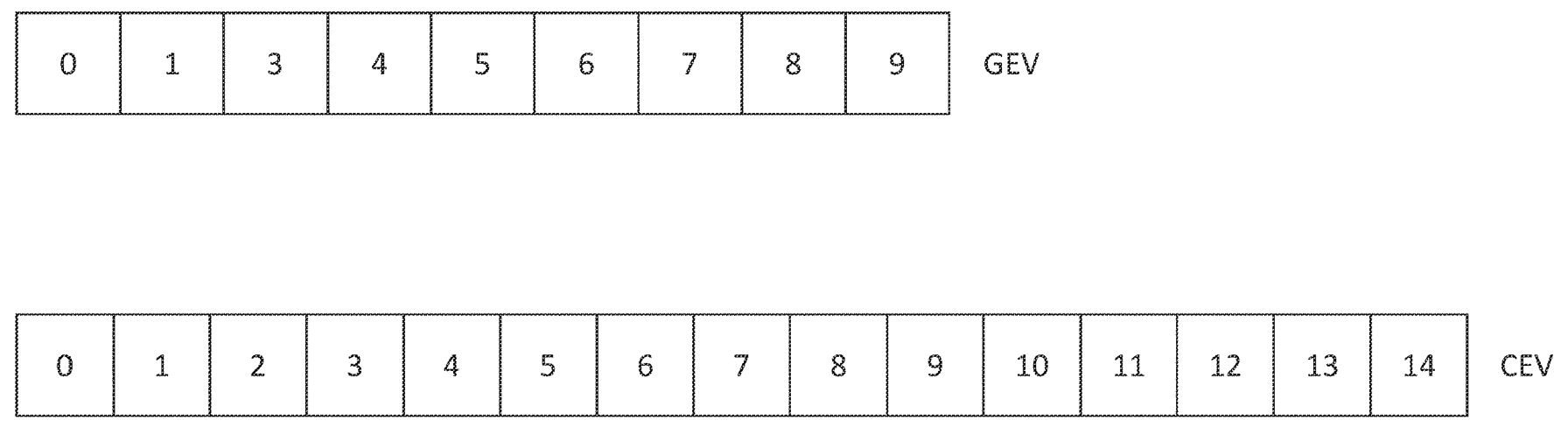

Reference is made to FIG. 6, which illustrates examples of the GEV and the CEV. Both of the event vectors comprise a plurality of elements, and provide a bitmask, which indicates for each event class whether an event of that event class has occurred. Each element of the CEV indicates whether an event of the respective class has occurred on the processing node storing that CEV. Each element of the GEV indicates whether an event of the respective class has occurred on any of the processing nodes of the system. The CEV comprises more elements than the GEV, reflecting that only a subset of the event classes for which events are captured in the CEV are aggregated globally. In embodiments, the CEV comprises 15 elements, one for each of 15 event classes. The GEV comprises 10 elements, one for each of 10 event classes, which reflect that events in the first 10 event classes captured in the CEV are aggregated globally. The numbering of the vector elements in FIG. 6 reflects the event class ID associated with each element.

Reference is made herein to 'event state'. This refers to the state of the CEV and GEV. Reference is also made to 'global event state', which refers to the state of the GEV.

Figure 5A:
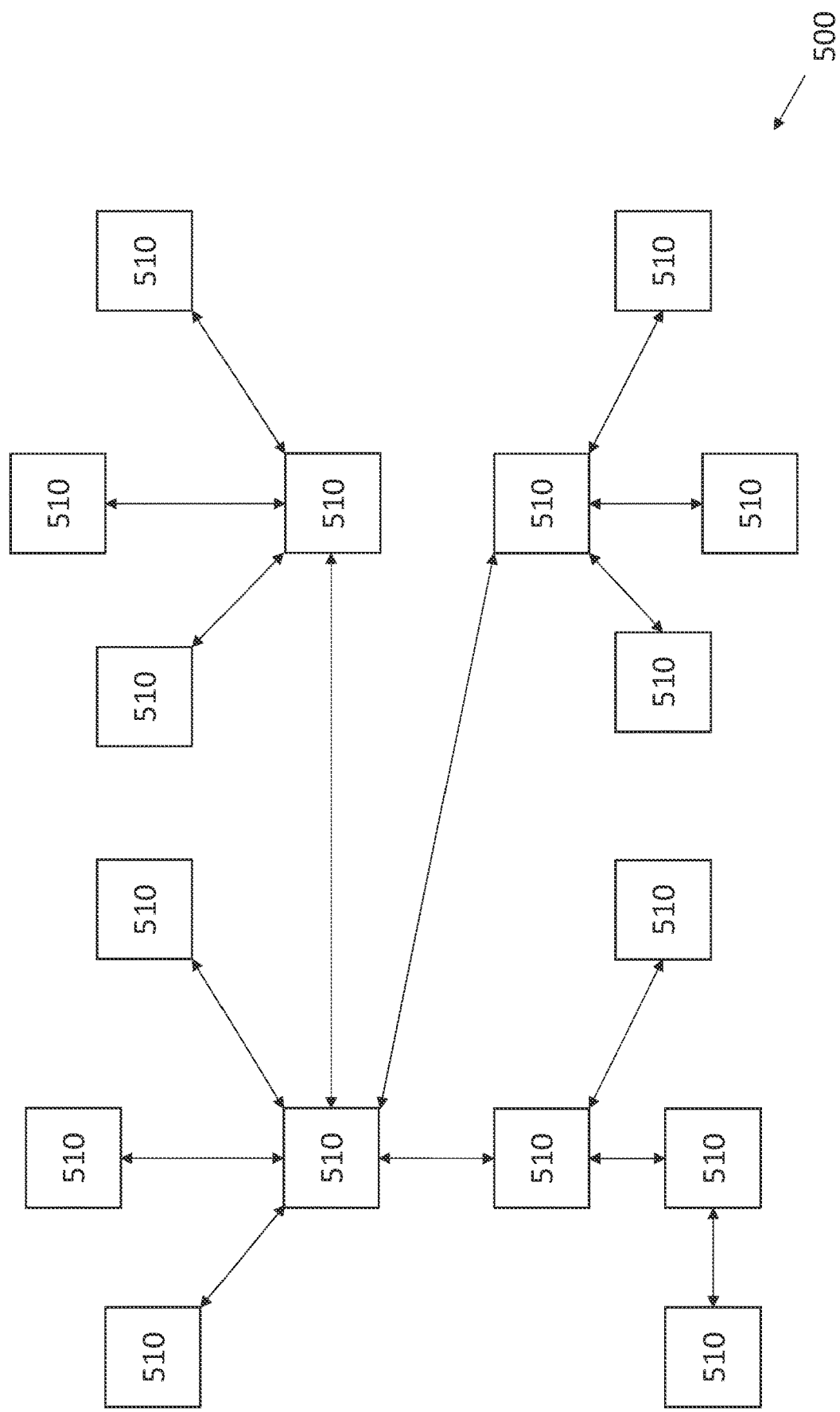
FIG. 5A illustrates a system of processing nodes connected together to form a spanning tree graph for the exchange of global event state.

Reference is made to FIG. 5A, which illustrates a system 500 of processing nodes 510. Each of the processing nodes 510 may be a processing node 300 or a processing node 400. In FIG. 5A, an example of how each of the nodes 510 are connected for the aggregation of global event state is shown. These connections are the connections used for the transmission of global event state, and hence are used for aggregated of the global event state across the system 500. It would be appreciated that in embodiments, there may be additional connections between the nodes 510 other than those shown, where these additional connections are used for the exchange of data plane traffic or other types of control plane traffic, e.g. sync messages.

The connections between the nodes 510 that are used for the exchange of the global event state form a spanning tree. The spanning tree enables communication between any of the nodes 510 in the system 500, but does so without any cycles (or rings) being provided in the graph that is formed by the interconnected nodes 510. The use of the spanning tree enables messages to be transmitted between any two of the nodes 510 is a small number of hops, whilst maintaining a simple topology with a smaller number of connections than might otherwise be the case.

Figure 5B:
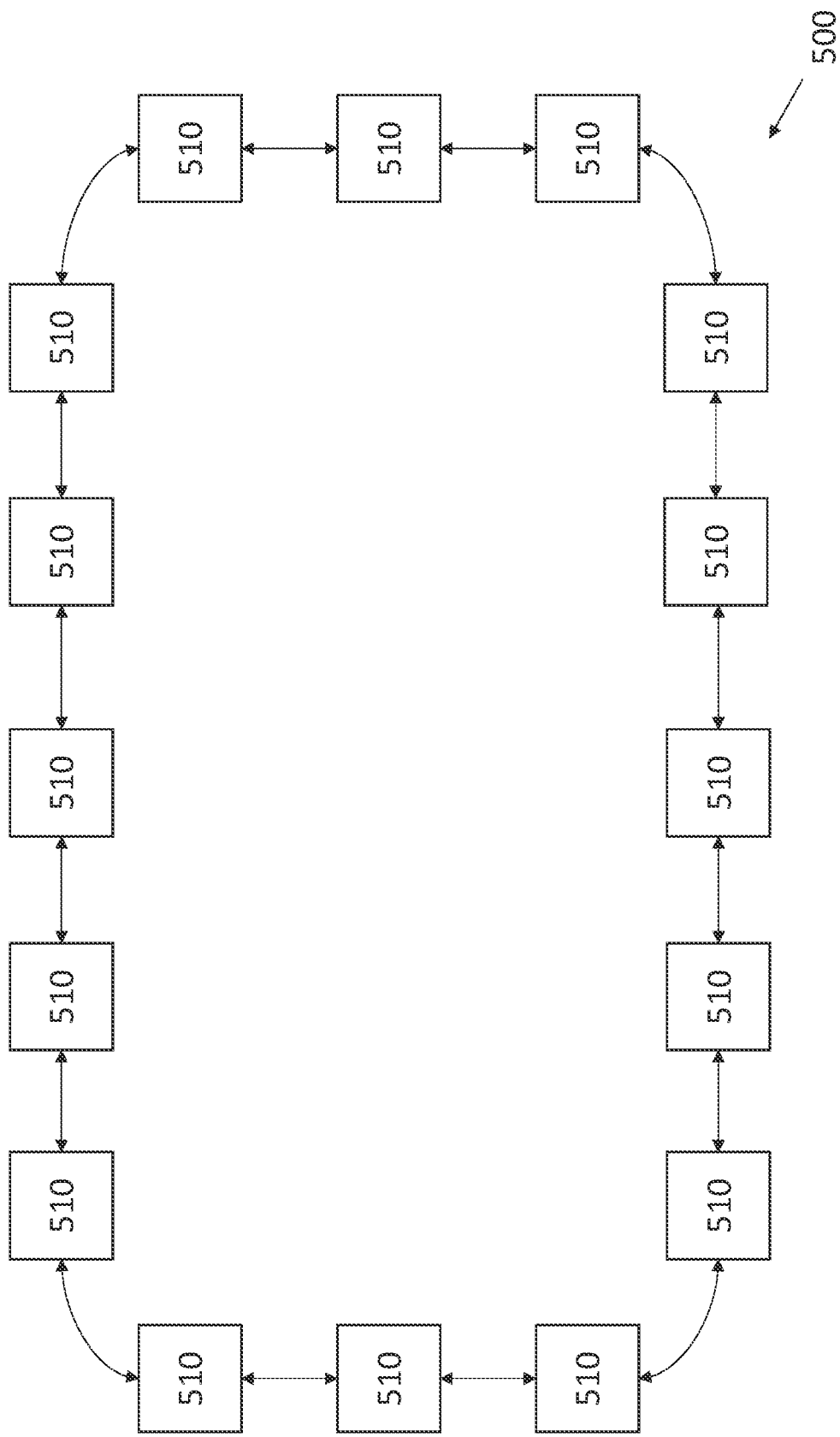
FIG. 5B illustrates a system of processing nodes connected together in a ring topology for the exchange of global event state.

Reference is made to FIG. 5B, which illustrates an example in which the system 500 of nodes 510 are connected in an alternative topology for the exchange of global event state. In this case, the nodes 510 are connected together in a ring and the global event state is exchanged between the nodes 510 around the ring. The ring topology has the advantage that redundancy is built into the system 500. If a link that is used for sending updates to the GEV goes down, updates may still be sent between any two nodes 510 in the system 500 since there is an alternative pathway for the sending of such updates. Hence, the aggregation of global event state is still possible with a ring topology.

Although, in the examples of FIGS. 5A and 5B, the system 500 is shown as comprising only 16 processing nodes 510, in practice the system 500 would likely comprise thousands of processing nodes 510.

Figure 5C:
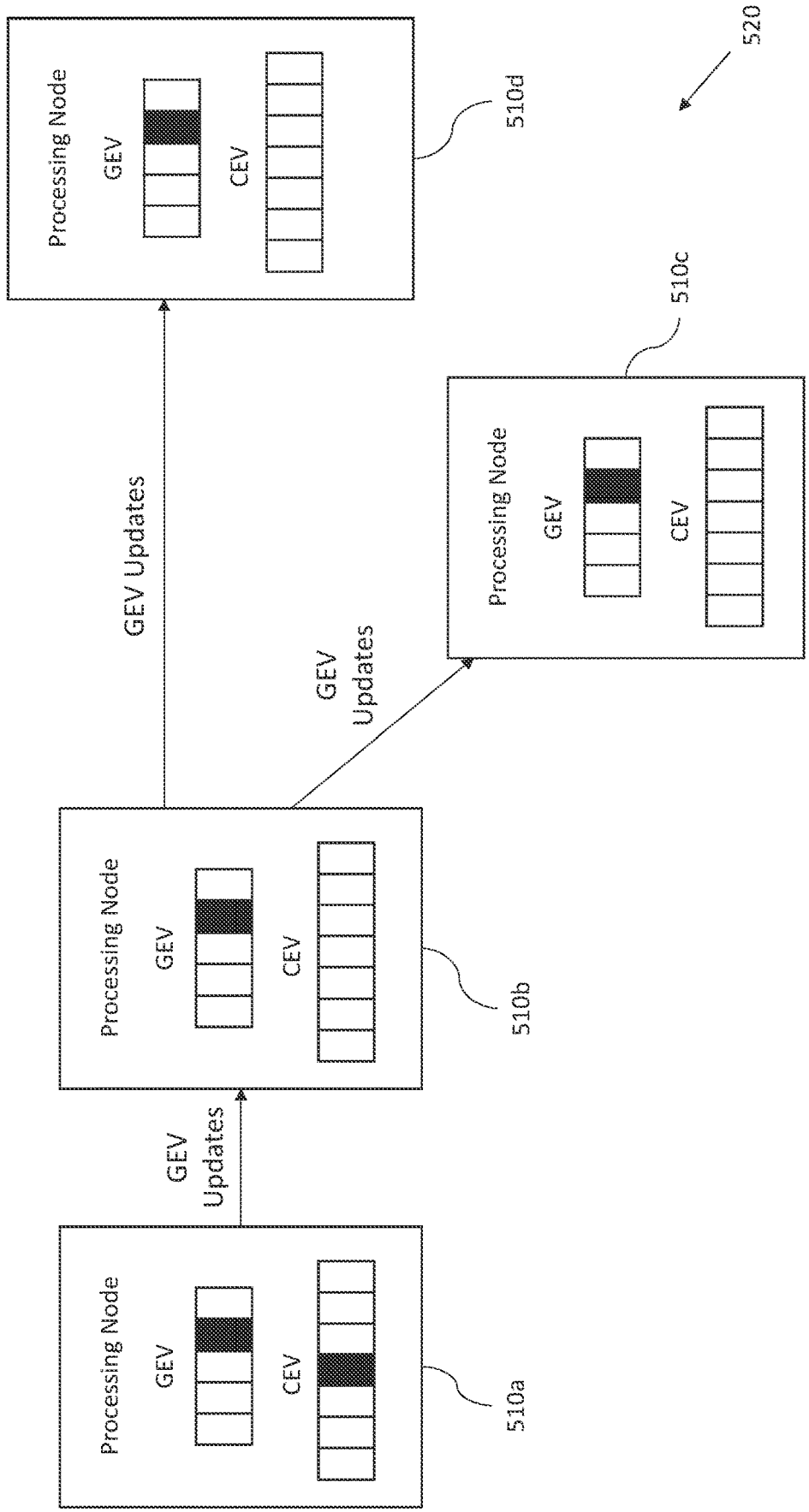
FIG. 5C illustrates the exchange of global event state between a set of processing nodes in the system.

Reference is made to FIG. 5C, which illustrates how the global event state may be aggregated between different nodes 510 of the system 500. A part 520 of the system 500 is shown, where this part 520 comprises example processing nodes 510*a-d*.

As shown, each of the nodes 510*a-d* of the system maintains a copy of the GEV and a copy of its own CEV. In practice, each node comprises a plurality of registers, some of which are referred to as global event vector registers (GEVVRs) and hold one of the copies of the GEV, and some of which are referred to as the Colossus event vector registers (CEVVRs) and hold one of the copies of the CEV. However, logically it may be considered that there is a single copy of the node's CEV and a single copy of the GEV on each of the nodes 510*a*-510*d*.

Whenever an event of an event class that is recorded in the CEV occurs on one of the nodes 510*a-d*, processing circuitry of that node 510*a-d* updates the CEV held on that node 510. Specifically, the processing circuitry of that node 510*a-d* updates the element of the CEV that corresponds to the event class of the event that was detected. If the event class is a class that is propagated across the nodes 510, in addition to updating the CEV on one of the nodes 510*a-d*, circuitry of that node 510 also updates the corresponding element of the GEV held on that node 510. Interface circuitry of the processing node 510 then causes an update message (which may be referred to as GCM message) comprising an indication of the update to the GEV to be sent to one or more other processing nodes 510. Each such update message may comprise the entire updated GEV or an indication of the element of the GEV that is to be updated. The update message is sent from one of the nodes 510*a-d* to a node 510 that is a neighbouring node (i.e. is connected to) of the one of the nodes 510*a-d* sending the update. The node 510 that receives the update message, updates its copy of the GEV in accordance with the update message, and then sends one or more further update messages to its own neighbouring nodes 510 (other than the neighbouring node 510 that provided it with the update).

In the example in FIG. 5C, an event has occurred on processing node 510*a*. The event is of a class of event that the processing nodes 510*a-d* are configured to aggregate globally. As shown, in this example, the event has occurred in the fourth event class for which events are recorded in the CEV and GEV. However, the event class could be a different event class. In response to the detection of the event, processing circuitry of the node 510*a* causes the fourth element (which is associated with the fourth event class) of the CEV for node 510*a* to be set to indicate that an event of the fourth event class has occurred. Similarly, in response to the detection of the event, processing circuitry of the node 510*a* causes the fourth element (which is associated with the fourth event class) of the GEV for node 510*a* to be set to indicate that an event of the fourth event class has occurred.

In response to the update to the copy of the GEV on node 510*a*, circuitry of the node 510*a* causes a data packet to be issued to node 510*b*, where that data packet comprises an indication of the update to the GEV. The node 510*b* receives the data packet, and circuitry of the node 510*b* causes the copy of the GEV 510*b* held on the node 510*b* to be updated in accordance with the indication.

In response to the update to the copy of the GEV on node 510*b*, circuitry of the node 510*b* causes data packets to be issued to nodes 510*c*, 510*d*, where those data packet each comprise an indication of the update to the GEV. Circuitry of each of these nodes 510*c*, 510*d* causes each of the copies of the GEV held on the respective node 510 to be updated in accordance with indicated update provided in the data packets.

It will now be described how the event state is reported by a component in a processing node 510 and propagated to other components in that node 510

When an event is detected by a particular component of a processing node 510, that component forwards an event report to a regulator component of the node 510, which updates its copy of the CEV (known as the master copy)

before broadcasting the update to other components that maintain other copies of the CEV. The exchange of these messages between nodes may take place via a control bus architecture.

Figure 7:
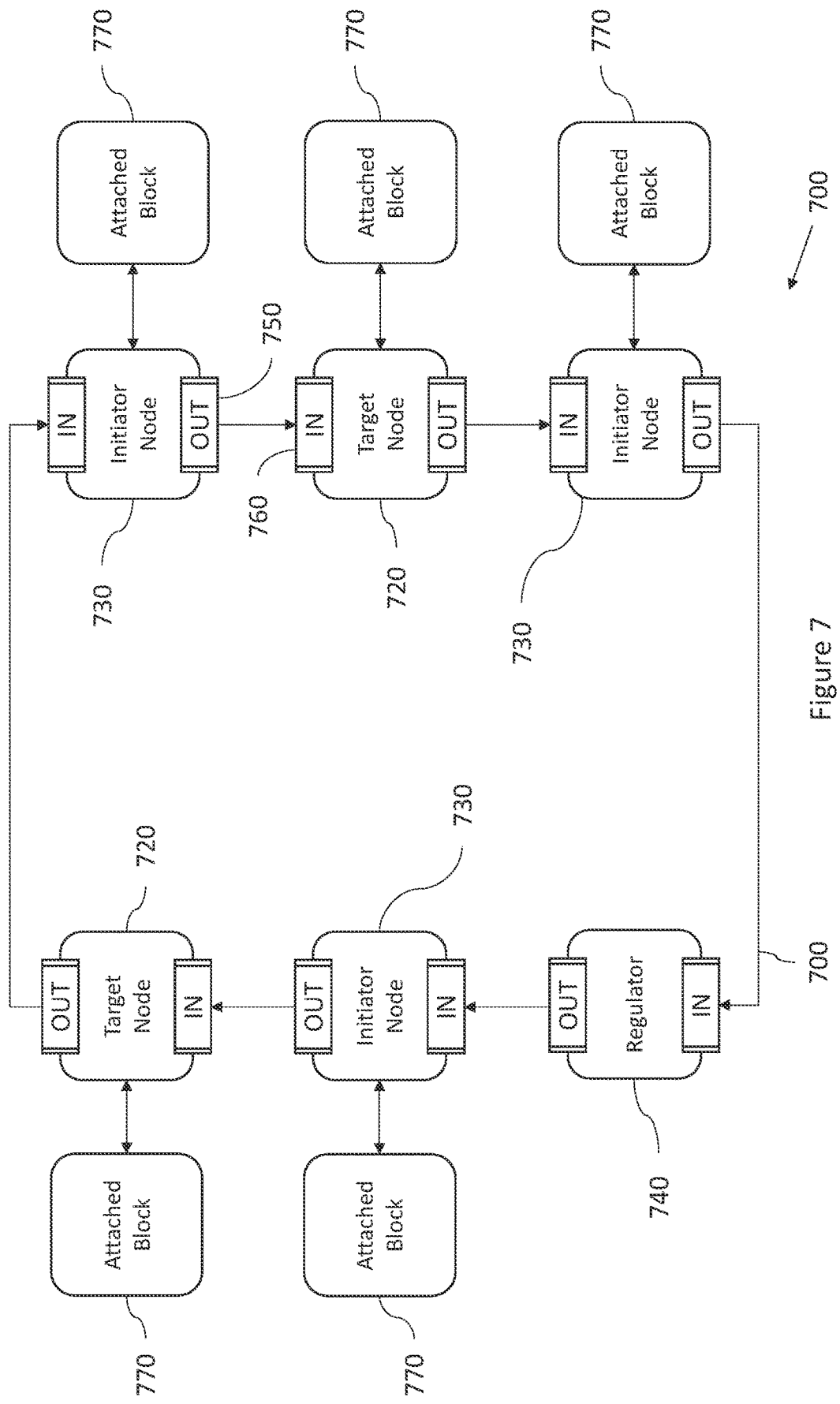
FIG. 7 illustrates a bus architecture used for the propagation of event state between components of a processing node.

Reference is made to FIG. 7, which illustrates an example of a control bus 700. The control bus 700 is implemented in a single chip, i.e. either device 300 or device 410. In the case that the control bus 700 is implemented in device 410, components may be provided in the device 400 that are attached to the control bus 700 for transferring packets between the control bus 700 and components on the other devices 420 belonging to the processing node 400, so as to allow event state to be exchanged between the regulator node 740 and components on those devices 420. The control bus 700 illustrated in FIG. 7 is implemented on a single chip 300/410.

The control bus 700 is described in more detail in our earlier U.S. application Ser. No. 17/328,143, which is incorporated by reference. The control bus 700 is a data path for carrying single word control traffic in ring. The control bus 700 is a pipelined data bus via which data packets move from stage to stage in the pipeline at a rate determined by a clock pulse that is applied to the control bus 700. The ring comprises a plurality of a nodes 710, with traffic passing from one node 710 to the next node 710 in a direction of flow around the ring. Each node's output port 750 is connected to the input port 760 of the next node 710 in the ring.

Some of the nodes (referred to herein as target nodes) have circuitry for receiving requests to read or write to configuration settings associated with that node. An example of a target node 720 is shown attached to the bus 700. Such a target node 720 stores configuration settings for its associated component 770, where those configuration settings may be read from or written to by read/write requests received from the control bus 700. The configuration settings (or configuration state) includes a copy of the CEV and the GEV.

Some of the nodes (referred to herein as initiator nodes) have requesting circuitry for issuing read or write requests onto the bus 700. An example of an initiator node 730 is shown attached to the bus 700. Under the control of an attached module, such an initiator node 730 issues read or write requests to configuration settings associated with target nodes 720 attached to the control bus 700.

Initiators 730 may be controlled by software in some cases, and by fixed function hardware engines in others.

As shown, each of the initiator nodes 730 and each of the target nodes 720 has an associated component (shown as attached block) 770. The initiator nodes 730 and target nodes 720 may be implemented within their associated component 770. Each of the initiators 730 operates under the control of its associated component 770 to dispatch read or write requests on to the control bus 700. Each of the target nodes 730 receives and stores configuration state for controlling its associated component 770. This configuration state is output from the target node 720 to the associated component.

Each of the initiator nodes 730 is capable of issuing requests to target nodes 720 and receiving completions from the target nodes 720. Each request is either a command to read from a storage (e.g. an attached addressable entity or auto-generated register) associated with the target node 720 or a request to write to such a storage associated with the target node 720. In response to receipt of such a request, a target node 720 responds by issuing a completion. A completion provides a status update indicating whether or not the read or write request was successful or not. In the case of read completions, each of the completions contains the data that was read from the target node 720 and is returned to the initiator node 730 that issued the read request. In the case of write completions, the write completion comprises an indication of whether or not the write request was successful or not.

A further type of transaction supported by the control bus 700 is an event report. Event reports are packets posted to the control bus 700 that are dispatched on to the control bus 700 either by an initiator node 730 or by a target node 720 and contain information relating to a detected event. When a hardware unit 770 detects an event, it controls its associated initiator node 730 or associated target node 720 to cause an event report to be dispatched on to the control bus 700.

Figure 8:
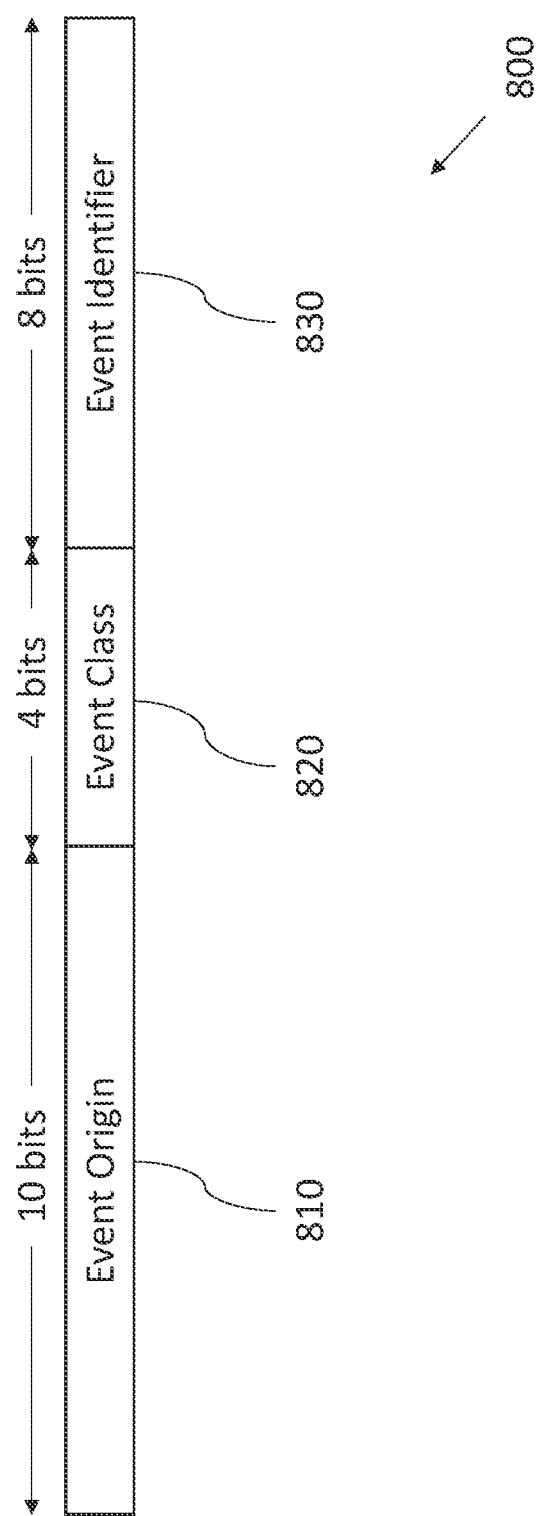
FIG. 8 illustrates an event report dispatched by a component for delivery to a control node of the processing node.

Reference is made to FIG. 8, which illustrates an event report 800. The event report 800 comprises an event class 820 and an event identifier 830, which are supplied by the hardware unit 770 that detects the event. The hardware unit 770 supplies both of these fields 820, 830 to its associated node 720/730. The event report 800 comprises an event origin field 810, which is prefixed by the node 720/730 that receives the event class 820 and event identifier 830 for the event. The event origin field 810 uniquely identifies the node 720/730 amongst all of the nodes 720/730 belonging to the processing node 510.

The event class field 820 identifies the event class that the detected event falls into. In embodiments, the event class identifies one of the 15 event classes discussed above that may be captured in the CEV. The event identifier field 830 identifies a unique event occurring at the component 770 that is identified by the origin field 810 and occurring within the event class 820. The event identifier field 830 also comprises additional details of the event.

When an event report is dispatched onto the bus 700, that event report is delivered to the Cbus regulator 740. The Cbus regulator 740 may also be referred to as control node 740 or control component 740. The event report circulates on the bus 700 until it reaches the Regulator 740, where it is consumed and the Event logged.

Figure 10:
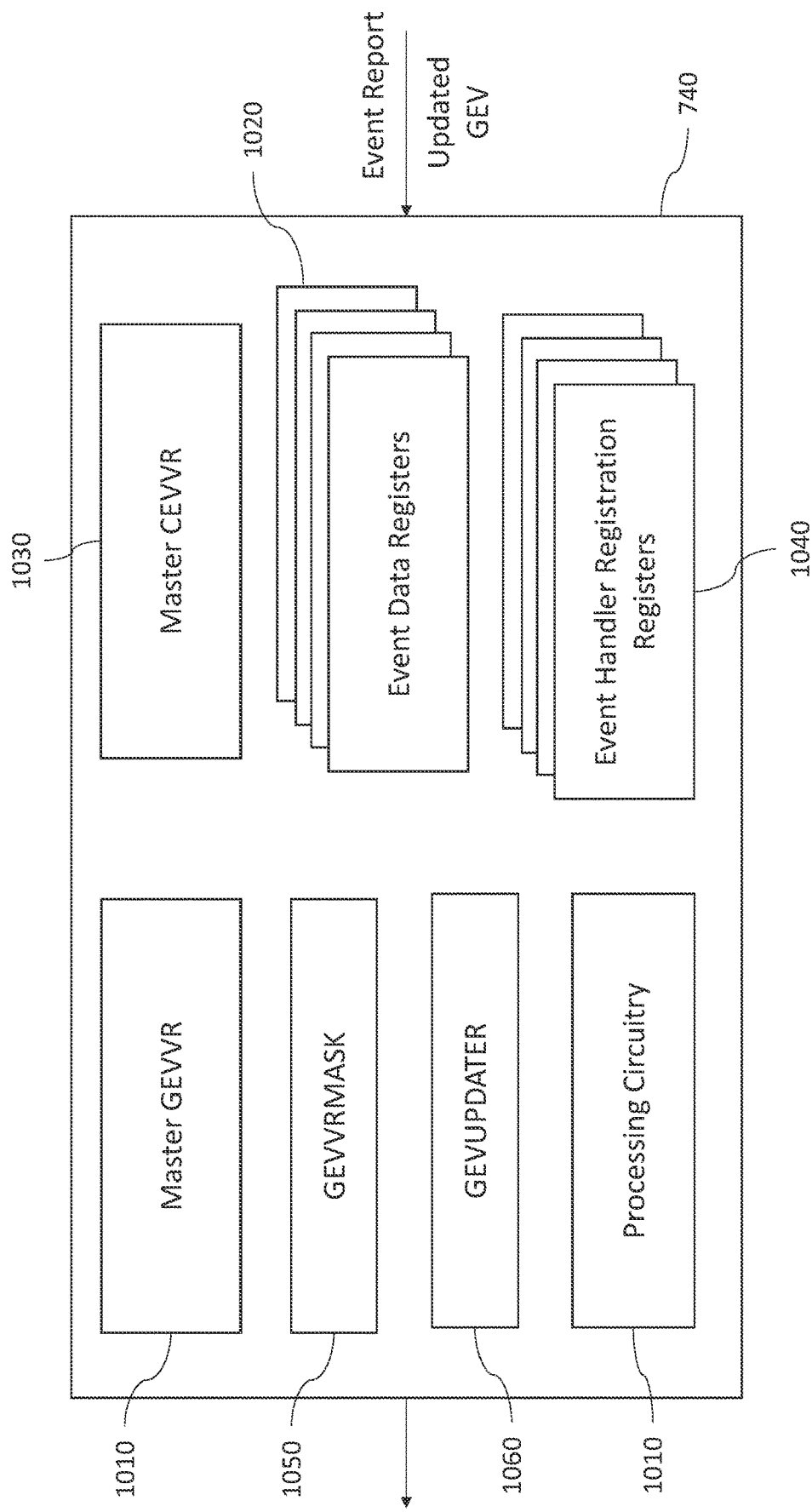
FIG. 10 illustrates the registers and processing circuitry held in the control node that enable the control node to store and distribute event state.

Reference is made to FIG. 10, which illustrates an example embodiment of the regulator node 740. FIG. 10 illustrates components of the regulator 740 for the logging of the event state in response to receipt of event reports. The regulator node 740 comprises processing circuitry 1010 for performing the operations described herein as being performed by the regulator node 740. The regulator node 740 comprises a plurality of registers 1020 for storing the information received in the event reports. These registers 1020 are referred to as event data register (EDR) 1020. The regulator node 740 comprises an EDR 1020 for each of the plurality of event classes.

When an event report is received at the regulator 740, the regulator 740 causes information from that event report to be stored in the EDR 1020 for the event class identified in the event report. The information stored in the EDR 1020 comprises the event identifier 830 from that event report and the event origin identifier 810 from the event report. Each EDR 1020 also comprises an event flag, which is set to indicate that an event of the class corresponding to the class of the EDR 1020 has occurred. In response to the event report, if the event flag for the EDR 1020 corresponding to the class of the event report is not already set, the node 740 causes that event flag to be updated to indicate that an event has occurred for that event class.

The regulator 740 also comprises a register 1030 for storing a copy of the CEV for the processing node 510. This register 1030 is referred to as the master CEVVR 1030, since it is first of the CEVVRs in the node 510 to be updated in response to the detection of an event. When the event report is received at the regulator 740, if the bit of the CEV corresponding to the event class identified in the event report is not already set, the regulator 740 causes that bit of the CEV to be set to indicate that an event of that class has occurred. The CEV exhibits idempotency, such that, if a bit of the CEV for a particular event class is already set, then when a subsequent event report of the same event class is received, that bit of the CEV remains unchanged. The regulator node 740 controls access permissions for the CEV such that the bits of the CEV, may not be unset except in response to a reset event.

The regulator node 740 comprises a register 1010 for storing a copy of the GEV. The register 1010 is referred to as the master GEVVR 1010, since it updated prior to the updated of the GEVVRs of the target nodes 720 in the same processing node 510. The master GEVVR 1010 can be updated in response to either i) the detection of an event in its own node 510 or ii) a packet received at the node 510 indicating an update to the GEV, where that update results from an event that has occurred on another node 510.

The regulator node 740 comprises a mask register 1050, referred to herein as the GEVVRMASK register 1050. The GEVVRMASK register 1050 provides a set of bits, which indicate for each event class having a corresponding element in the GEV, whether or not global aggregation is enabled for that event class. To ensure consistency in which event classes are aggregated across the system 500, the values held in the GEVVRMASK register 1050 are set to be the same for each of the nodes 510 in the system 500.

When the event report is received at the regulator 740, if the bit in the GEVVRMASK register 1050 corresponding to the event class identified in the event report is set to indicate that global aggregation is enabled, and the bit set in the GEVVR 1010 is not already set to indicate an event has occurred in that class, the regulator 740 then causes the bit of the GEV for that class to be set to indicate that an event of that class has occurred. The GEV exhibits idempotency, such that, if a bit of the GEV for a particular event class is already set, then when a subsequent event report of the same event class is received at the regulator 740, that bit of the GEV remains unchanged. The regulator node 740 controls access permissions for the GEV, such that bits of the GEV that indicate the occurrence of an event, may not be unset except in response to a reset event.

When one or more of the event flags in the EDRs 1020 changes state to indicate an event has occurred, the regulator 740 broadcasts an update message to all of the target nodes 720 in the processing node 510. The update message is a message sent via the control bus 700 to update the CEVVRs of each of the target nodes 720 in the processing node 510. The update message causes each of the copies of the CEV in the node 510 to be updated such that the element of the CEV associated with the class for which the event flag was set, is updated to reflect that an event has occurred in that class.

Additionally, when one or more bits in the master GEVVR 1010 changes state, the regulator 740 broadcasts an update message (which may be the same update message used to update the copies of the CEV) to all of the target nodes 720 in the processing node 510. The update message is a message sent via the control bus 700 to update the GEVVRs of each of the target nodes 720 in the processing node 510. The update message causes each of the copies of the GEV in the target nodes 720 to be updated such that the element of the GEV that is associated with the event class for which the event flag was set, is updated to reflect that an event has occurred in that class.

Figure 9:
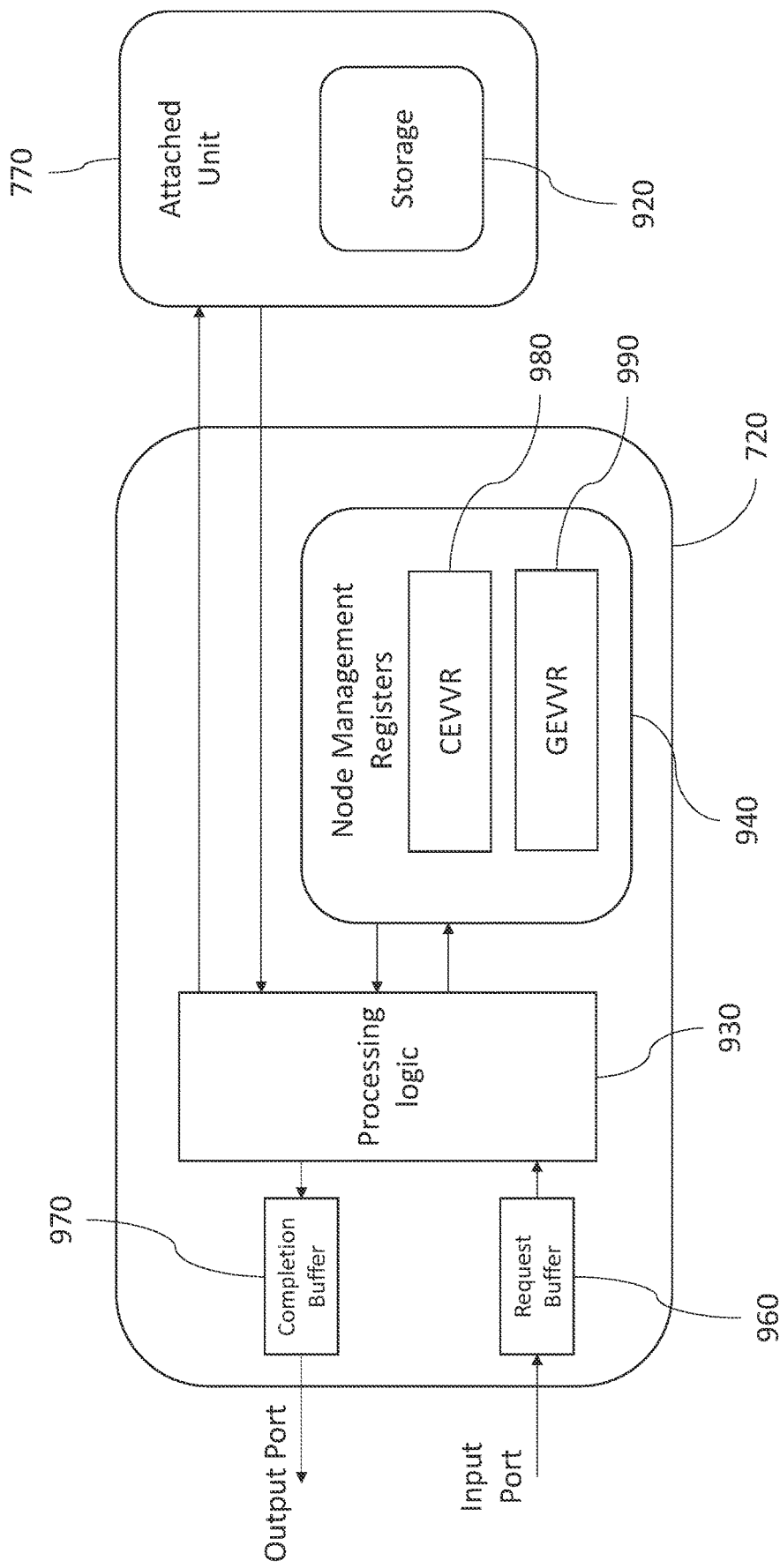
FIG. 9 illustrates a node on the bus for receiving and storing event state broadcast by the control node.

Reference is made to FIG. 9, which illustrates an example target node 720. Each target node 720 comprises at least one node management register 940. The node management register 940 can be written via a dedicated node management broadcast write request, which writes a common set of state to all of the node management registers 940 in the target nodes 720. Such broadcasts writes may be performed by the regulator node 740. An example of such broadcast writes are the update messages sent to update the copies of the CEV and GEV held in each target node 720.

In addition to the at least one target node management register 910, the target node 720 is associated with additional storage 920 that is part of the component 770 with which the target node 720 is associated. The additional storage 920 may comprise an auto-generated register and/or storage accessible via an addressable window. This additional storage 920 may include control registers on tiles 4 of the processing unit 2 that are addressable over a further bus. This additional storage 920 may allow access to off-chip storage, such as host storage that is accessible over PCI links. In this, case the additional storage 920 is memory of a host dispatcher that provides data written to the memory to the host storage.

The target node has an input port and an output port. The input port receives read and write requests from the control bus 700, with these requests being buffered in request buffer 960 and then passed to the processing logic 930. The outport port sends completions from the completion buffer 970 onto the control bus 700. The processing logic 930 may perform functions implemented in hardware or software. The processing logic 930 may comprises one or more of an ASIC, FPGA, or at least one processor configured to execute computer readable instructions stored in at least one memory of the target node 720.

As shown in FIG. 9, the node management registers 940 comprise a CEVVR 980 and a GEVVR 990. The CEV held in the CEVVR 980 is the same in all of the target nodes 720 in the processing node. Similarly, the GEV held in the GEVVR 990 is the same in all of the target nodes 720 in all of the processing nodes of the system. The processing logic 930 causes all of the elements of the CEV and the GEV to be output from the node management registers 940 to the attached component 770. These enables the attached component 770 to take action or perform its operations in dependence upon the error conditions indicated by the event state.

When the regulator 740 send an update message to update the CEV, this update message is received at the target node 720. The processing logic 930 cause the CEVVR 980 of that target node 720 to be updated in accordance with the update. The CEV in CEVVR 980 is updated to match the CEV held in the master CEVVR 1030. The processing logic 980 causes this updated CEV state to be propagated to the attached component 770 to enable that component to act on the updated error state. The same updates are performed in each of the target nodes 720 in the processing node 510.

Likewise, when the regulator 740 send an update message (which may be the same as or different to that used to update the GEV) to update the GEV, this update message is received at the target node 720. The processing logic 930 cause the GEVVR 990 of that target node 720 to be updated in accordance with the update. The GEV in GEVVR 990 is updated to match the GEV held in the master GEVVR 1010. The processing logic 980 causes this updated GEV state to be propagated to the attached component 770 to enable that component to act on the updated error state. The same updates are performed in each of the target nodes 720 in the processing node 510.

Amongst the components 770 that receive updates to their associated GEVs (i.e. those held in the target GEVVR 990) are the EPCs (e.g. EPCs 360, 460, 470) of the processing node 510. When certain EPCs receive updates to their GEV from the regulator node 740 of the processing node 510 to which they belong, these EPCs are configured to provide in an update message, an indication of the updated GEV state. The indication of the GEV state is propagated between the processing nodes 510 and used to update the GEVs held in those nodes 510. The certain EPCs configured to propagate the event state are those used for communicating over the connections shown in FIGS. 5A and 5B. It is these EPCs that provide the GEV update messages shown in FIG. 5C.

Figure 11:
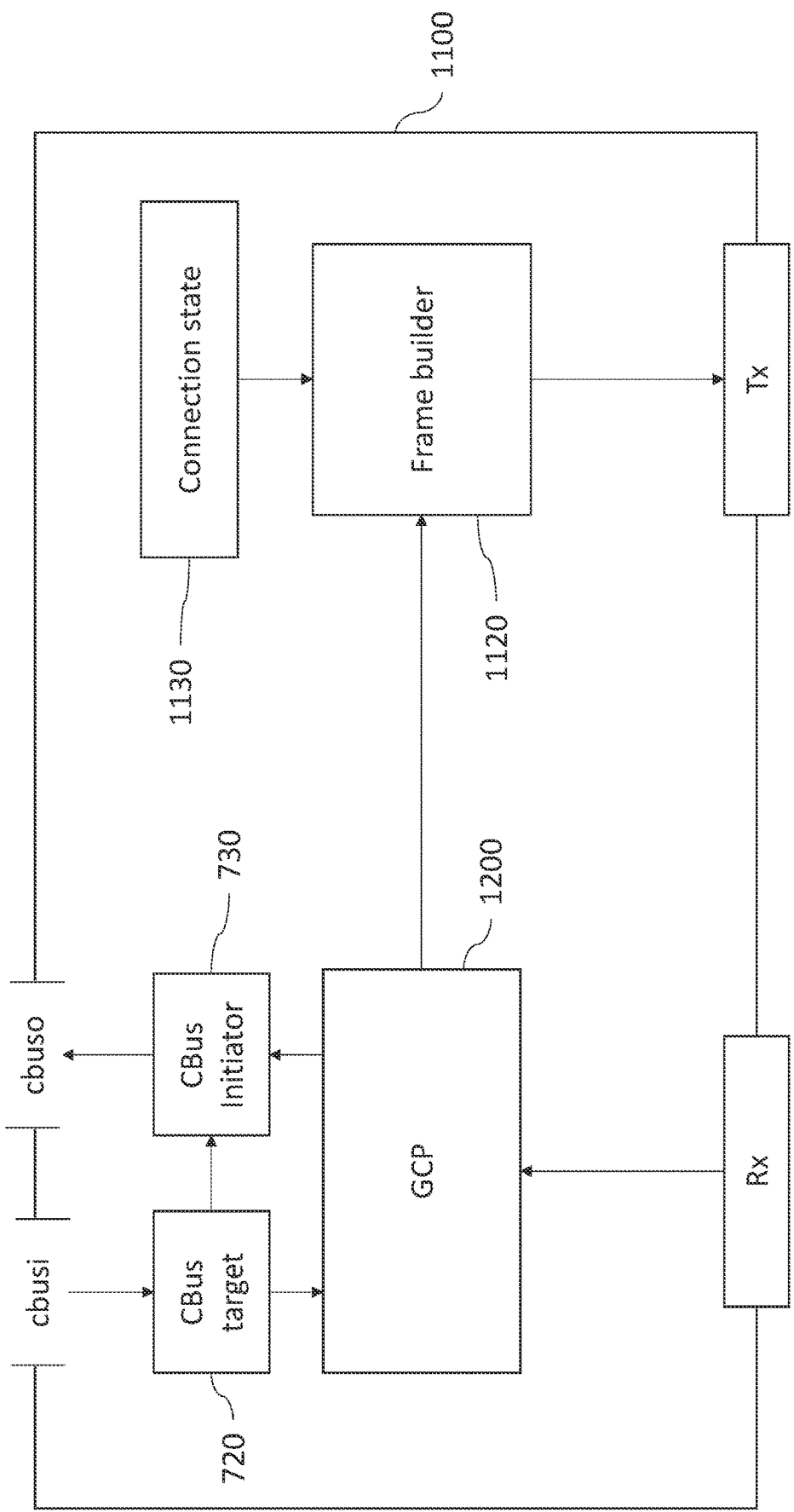
FIG. 11 illustrates an example of interface circuitry used for, amongst other things, exchanging global event state between the processing nodes.

Reference is made to FIG. 11, which illustrates an example of an EPC 1100 according to embodiments. The EPC 1100 may be one of the EPCs 360, 460, 470. The EPC 1100 comprises a target node 720 and an initiator node 730. The target node 720 enables updated global event state received from the regulator node 740 to be provided to the EPC 1100. In addition to the interfaces shown in FIG. 11, the EPC 1100 also comprises interfaces for exchanging data plane traffic with the processing unit 2. FIG. 11 shows a component within the EPC that is used for the exchange of control plane traffic (including the updates to the event state). This component is referred to herein as the global communications proxy (GCP) 1200. The GCP 1200 may receive Ethernet frames via receive interface (Rx), where these Ethernet frames comprise update messages to update its copy of the GEV. The GCP 1200 may dispatch update messages itself by the transmit interface (Tx), where these update messages are messages to update the GEV held in other processing nodes 510 in the system. The GCP 1200 causes the update messages to be provided to the frame builder 1120, which causes those update messages to be sent over transmit interface in Ethernet frames that are constructed in accordance with connections state held in the connection state register 1130.

Figure 12:
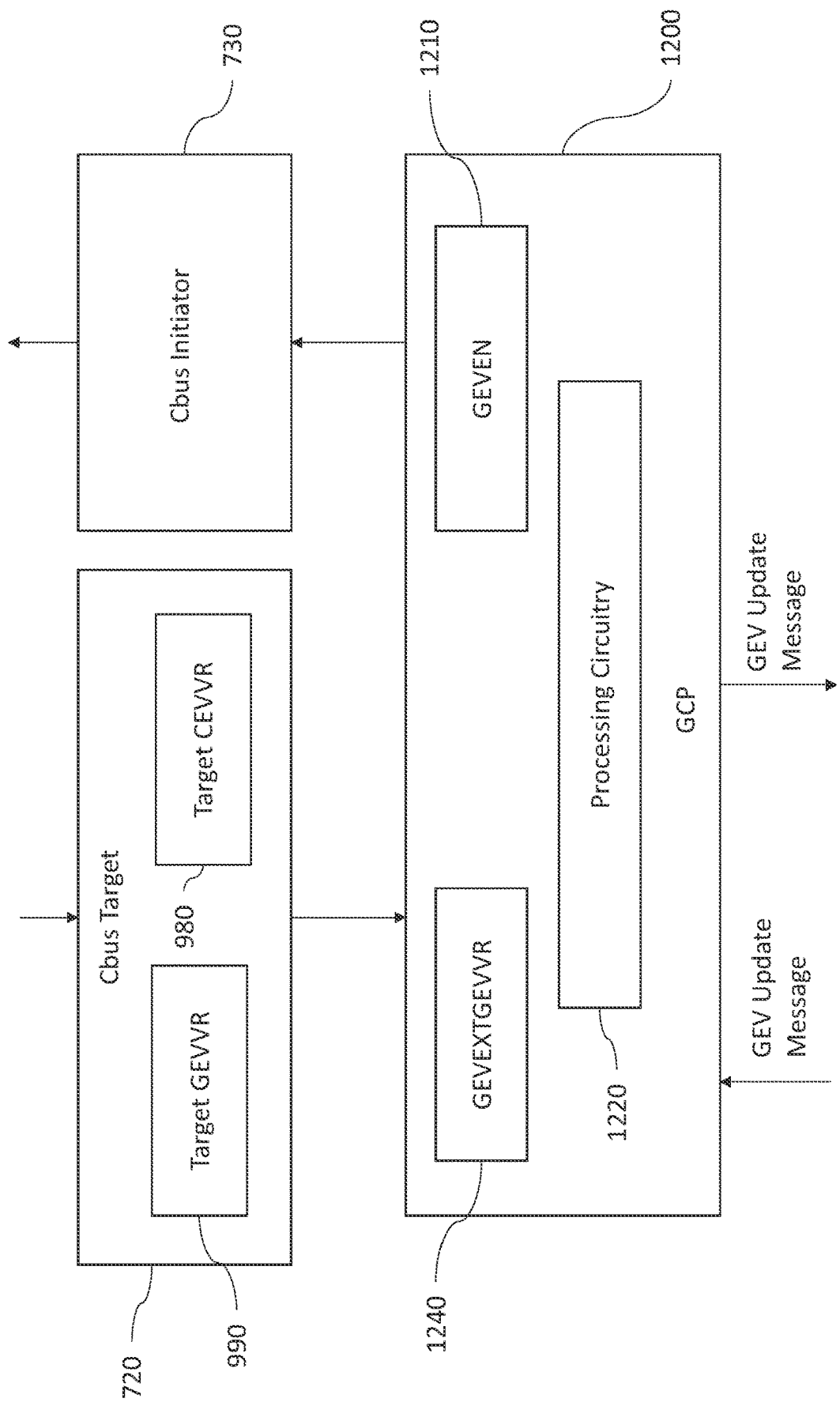
FIG. 12 illustrates in more detail, the components of the interface circuitry used for sending and receiving global event state.

Reference is made to FIG. 12, which illustrates the GCP 1200 and components within the GCP 1200 used for propagating event state. The GCP 1200 comprises processing circuitry 1220 for performing operations described herein as being performed by the GCP 1200. In addition to the GCP 1200, FIG. 12 also illustrates target and initiator nodes 720, 730 for enabling the GCP 1200 to exchange event state with the regulator node 740. It is here described how the GCP 1200 enables the global aggregation of event state to be performed. It would be appreciated that although the processing node 510 according to embodiments comprises a plurality of GCPs 1200, only a subset (one or more) of these GCPs 1200 will typically be active for the purposes of propagating global event state.

As described, in response to a GEV update message broadcast from the regulator 740, the GEVVR register 990 is updated. This updated state of the GEV is output from the target 720 to the GCP 1200. The GCP 1200 comprises a register 1210, referred to herein as the GEVEN register 1210. The register 1210 comprises an indication as to whether or not the GCP 1200 is enabled for global event aggregation. If the GCP 1200 is enabled, by the indication in register 1210, to perform global event aggregation, the GCP 1200 will respond to updates to its target GEVVR 990 by dispatching update packets to another processing node 510.

Each GCP 1200 comprises a further register 1240, referred to herein as the Global Event GCP External Global Event Vector Register (GEVEXTGEVVR) 1240. The GEVEXTGEVVR 1240 stores a copy of the GEV. The circuitry 1220 compares the copy of the GEV held in the GEVEXTGEVVR register 1240 to the copy of the GEV held in the GEVVR register 990 to determine whether or not updates should be dispatched to another node 510 or to the regulator 740 of the same node. If circuitry 1220 of the GCP 1200 determines that a bit is set in the target GEVVR 990, that is not set in the GEVEXTGEVVR 1240, the circuitry 1220 of the GCP 1200 updates the GEVEXTGEVVR register 1240 to match the copy of the GEV held in the GEVVR 990. The GCP 1200 also causes an update message to be dispatched to a GCP on another node 510 that the GPC 1200 is configured to communicate with. The update message provides an indication of the updated GEV and causes that recipient GCP to update its own GEVEXTGEVVR to match the GEVEXTGEVVR 1240 of the GCP 1200 that dispatched the update message.

To provide for reliable propagation, the GCP 1200 sends the update message three times. Having dispatched the GEV update message in a frame, the GCP 1200 then waits for 1000 system clock cycles of its chip 510 to elapse, before re-sending the same frame containing the update message. The GCP 1200 then waits another 5000 system clock cycles and then sends the frame a third time. If the GCP's 1200 associated target GEVVR 990 changes again before these copies have been sent, then the resend sequence above is aborted and a new update message is sent containing the new state held in the GEVVR 990.

The GCP 1200 may receive update messages from a GCP on another node 510 that cause the copy of the GEV in its GEVEXTGEVVR 1240 to be updated. As a result of such updates, the copy of the GEV held in the GEVEXTGEVVR 1240 may not match the copy of the GEV held in the target GEVVR 990 associated with the GCP 1200. In response to determining that a bit is set in the GEVEXTGEVVR 1240 that is not set in the associated GEVVR 990, the GCP 1200 issues a write request to the Cbus regulator 740 on its own node 510, where that write request is a request to update the GEVUPDATER register 1060 to match the copy of the GEV now held in the GEVEXTGEVVR 1240.

In response to receipt of the write to the GEVUPDATER 1060, the regulator node 740 updates the GEVUPDATER 1060 accordingly. In response to the update to GEVUPDATER 1060, the regulator 740 updates its copy of the GEV held in the master GEV register 1010 for the processing node 510. The update to master GEVVR 1010 is performed such that any bit set in GEVUPDATER 1060 to indicate that an event has taken place in a particular class is also set in GEVVR 1010. However, for any bits in GEVUPDATER 1060 that are set to indicate that no event has occurred in that class, then the regulator 740 will not update GEVVR 1010 to indicate that no event has occurred in that class. In this way, the update policies of the regulator 740 ensure that the GEV held in GEVVR 1010 is idempotent.

In addition to updating its copy of the GEV held in register 1010, the regulator 740 broadcasts an update message on the control bus 700 to all of the target nodes 720 of the processing node 510.

The update message comprises the updated GEV held in the register 1010 of the regulator 740. Referring to FIG. 9, the processing logic 930 of each target node 720 receives the update message and updates the GEVVR 990 held in that target node 720 with the updated GEV. The component 770 associated with the target node 720 has access to the copy of the GEV held in the GEVVR 990 of its target node 720.

Some of these components 770, which via their associated GEVVR 990 receive updates to their copy of the GEV, are themselves GCPs that are enabled to perform global event aggregation. Each such GCP, in response to an update to its GEVVR 990, issues an update message to another node 510. The updated GEV is then propagated to the different components of that another node 510 in the same manner as described above.

Figure 5D:
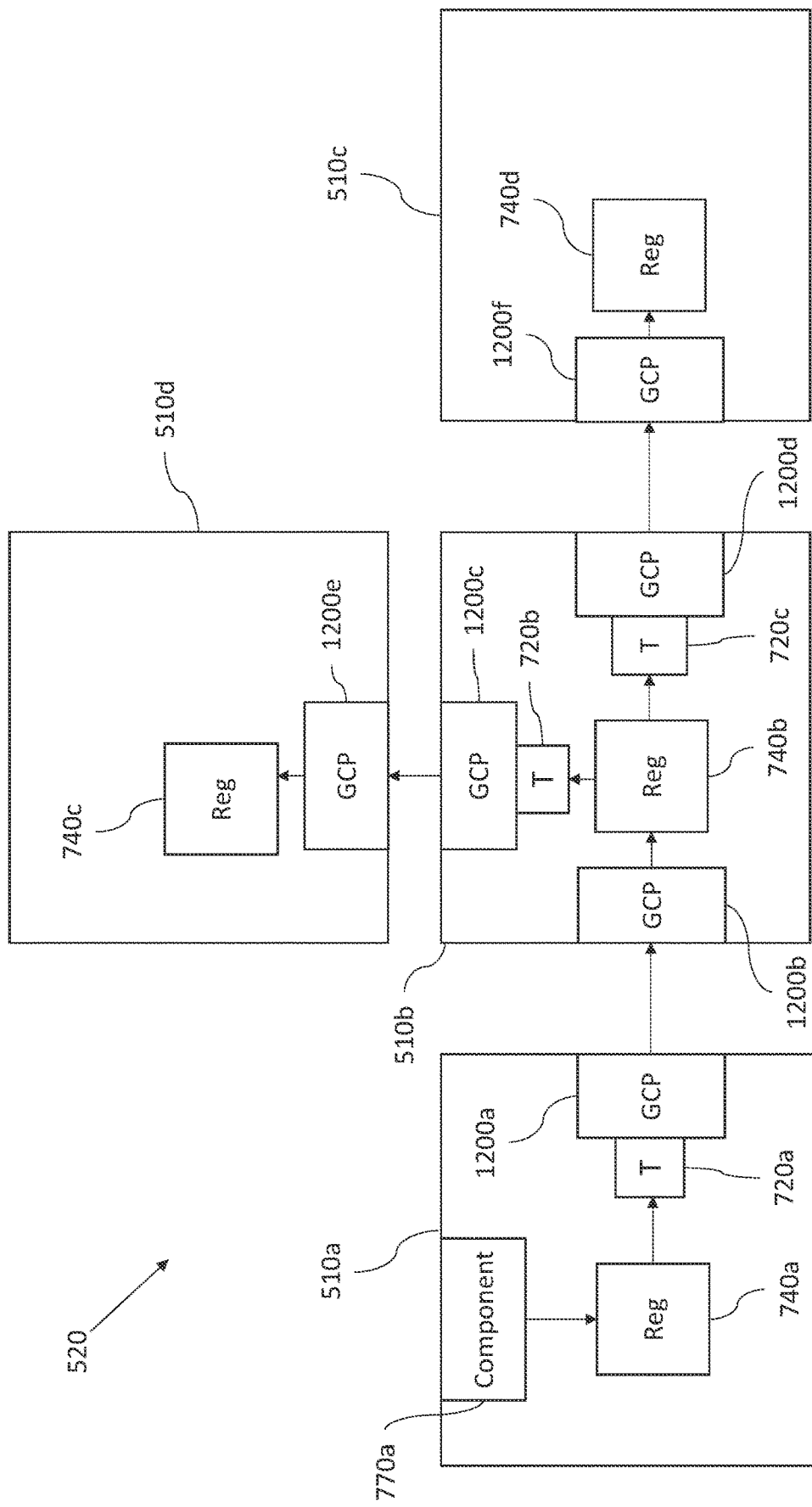
FIG. 5D illustrates how the global event state is propagated to multiple components in each of the set of processing nodes.

Reference is made to FIG. 5D, which illustrates in more detail how updated global event state is propagated between the nodes 510*a-d* of the part 520 of the system 500. When a component 770*a* (which may itself be a GCP) encounters an error event, it provides a report of this event to the regulator 740*a*. The regulator 740*a* updates its master copy of the CEV and GEV for the node 510*a* and broadcasts updates of these vectors to each of the target nodes 720 in the node 510*a*. The GCP 1200*a* detects an update to the copy of the GEV held in its target node 720*a* and, in response, provides a message containing the updated GEV to the node 510*b*. The node 510*b* comprises a GCP 1200*b* configured to receive the update and dispatch an update message via the bus 700 of that node 510*b* to the regulator 740*b* of that node 510*b*. The regulator 740*b* in response to receiving the update, updates its copy of the GEV to be consistent with the copies of the GEV held on node 510*a*. The regulator 740*b* also broadcast the update of the GEV to the target nodes 720 (including target nodes 720*b*, 720*c*) of processing node 510*b*. The GCPs 1200*c,d* associated with target nodes 720*b,c* respond by dispatching update messages comprising the update to the GCPs 1200*e,f* on nodes 510*c,d*. The GCPs 1200*e,f* propagate these updates to their own regulator nodes 740*c,d*, which broadcast updates to the components on those nodes 510*c,d*. In this way, an update to the GEV that is generated in response to an event detected by a component 770 on one node 510*a* is propagated to the components of other nodes 510*b-d* in the system 500.

The result of the propagation of the local event state (i.e. the CEV) and the global event state (i.e. the GEV) to the components 770 provides each component 770 in the system 500 with access to two different event vectors. Each component 770 has access to, via its own local copy of the CEV for its processing node 510, device wide event and error state for its own processing node 510. Each component 770 also has access to, via its own local copy of the GEV for the system, system wide event and error state. On the basis of this state, components 770 may be configured to perform action. Such actions taken on the basis of a copy of the CEV or GEV accessible to a component are referred to herein as autonomous event handling (AEH). Different components 770 in the same processing node 510 may be configured to perform different actions in response to events belonging to the same class. One or more components 770 may be configured with different policies and be configured to perform different actions in response to events belonging to different event classes. Furthermore, one or more components 770 may perform different actions in response to events associated with its own processing node 510 (and reflected in its CEV) as compared to events associated with the system 500 (and reflected in the GEV).

An example of a component that may participate in AEH is circuitry (referred to herein as an exchange block (XB)) for enabling tiles 4 of the processing unit 2 to exchange data with devices external to the chip 510 on which the processing unit 2 is implemented.

Figure 13:
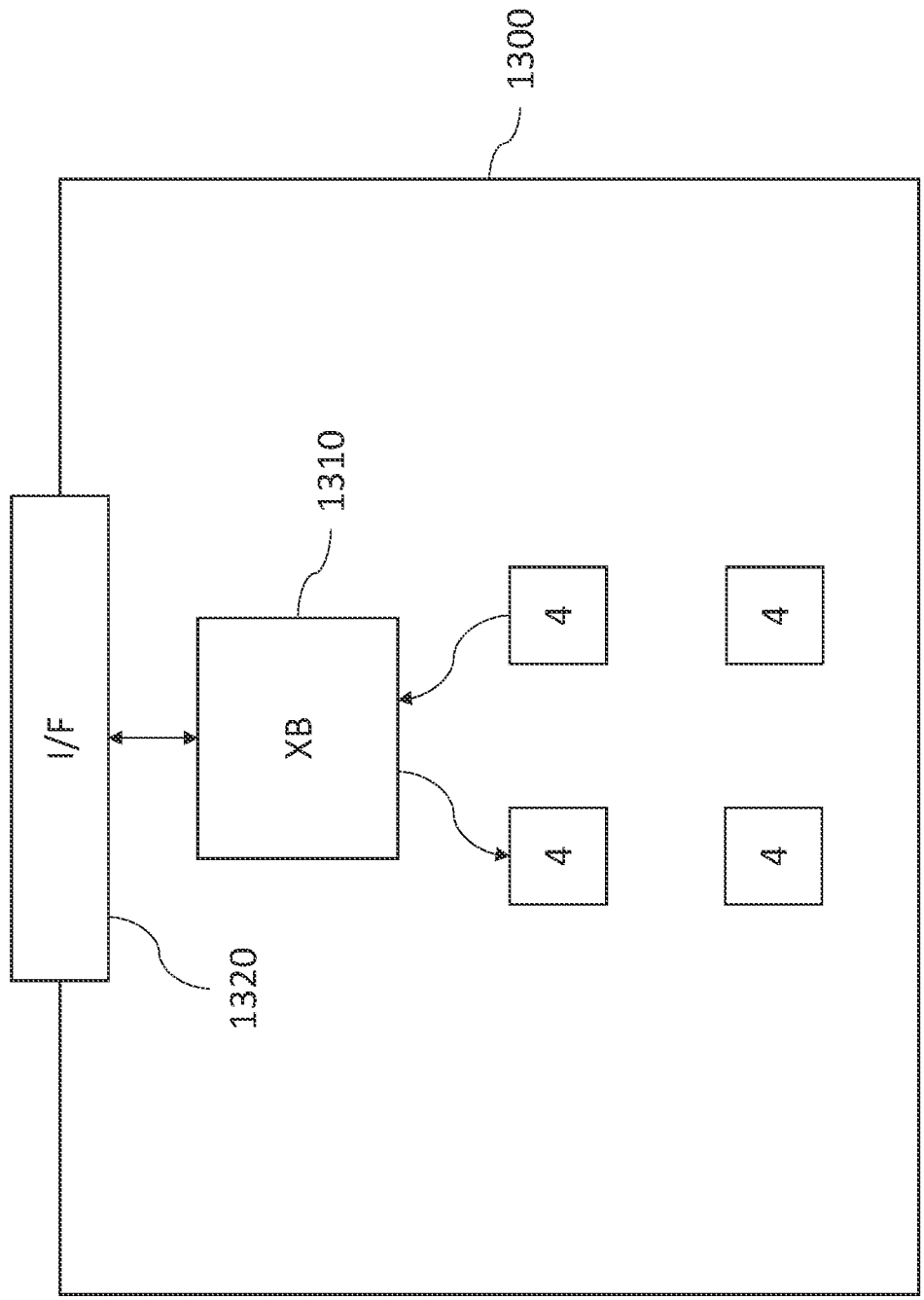
FIG. 13 illustrates an example of an exchange block for enabling tiles of a processing node to exchange data plane traffic with tiles of another processing node.

Reference is made to FIG. 13, which illustrates an example of a chip 1300 comprising an XB 1310 and a plurality of tiles 4. The XB 1310 comprises circuitry configured to perform the operations described. The XB 1310 is associated with an external interface 1320 of the chip 1300 over which it is configured to send and receive data packets. The XB 1310 receives packets in one format (the "TLink" format) from one or more tiles 4 and converts those packets to another format (the "Elink" format) before causing those packets to be transmitted over the external interface 1320. The XB 1310 receives packets in that other format (the "Elink" format) and converts those packets to a further format (the "TLink" format) before delivering those packets to one or more of the tiles 4. The XB 1310 is also configured to control sending by the tiles 4 by providing flow control messages to pass permission for sending between different tiles 4.

Figure 14:
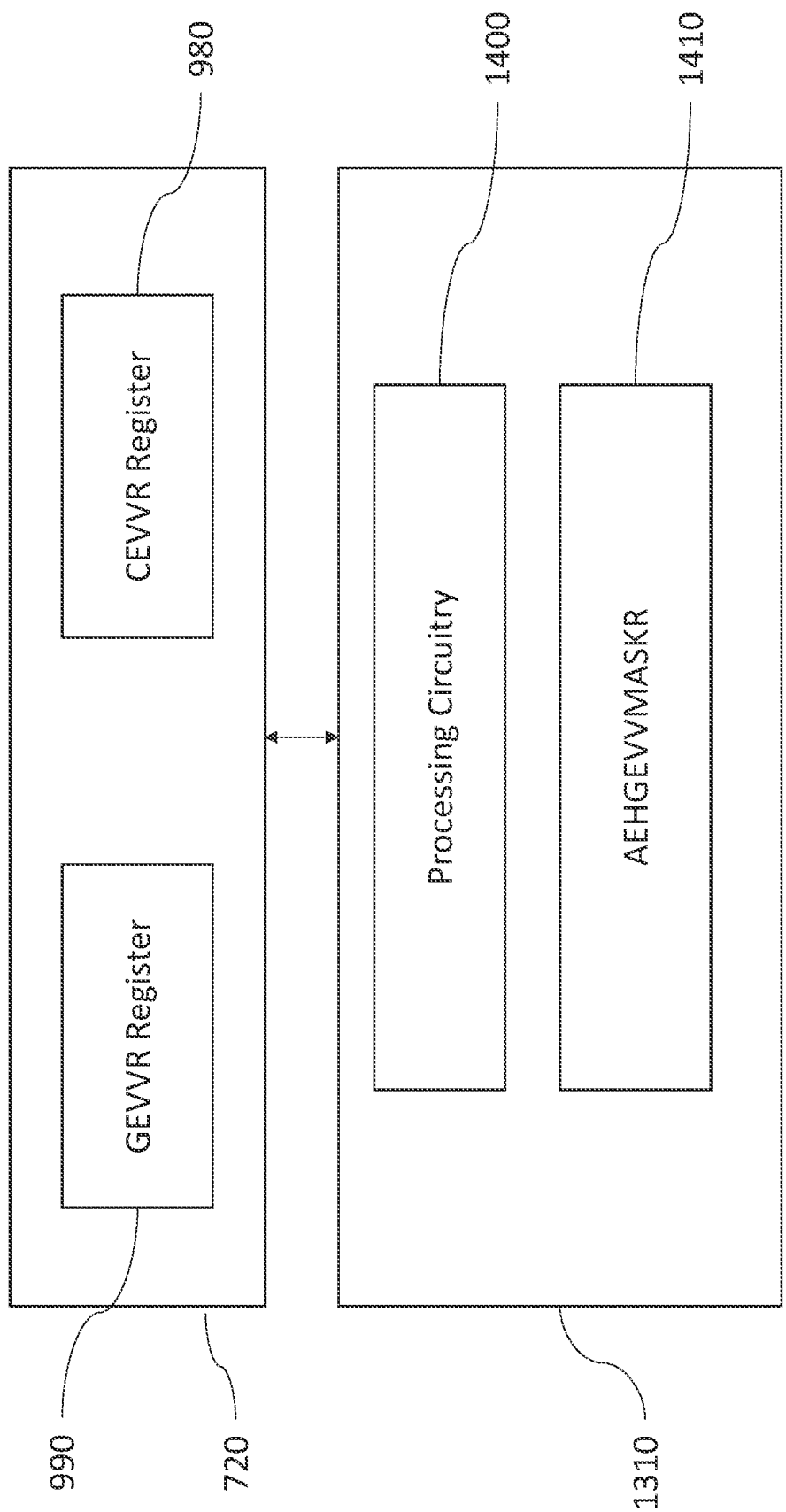
FIG. 14 illustrates an example of a register and circuitry in the exchange block for enabling that exchange block to engage in autonomous event handling in response to event state in either the local event vector or the global event vector.

The XB 1310 is configured to engage in certain autonomous error handling (AEH) in response to indication of an error in the GEV. Reference is made to FIG. 14, which illustrates the XB 1310 and its associated target node 720. The XB 1310 comprises processing circuitry 1400 for performing operations described herein as being performed by the XB 1310. The XB 1310 includes a mask register 1410 (referred to herein as the AEHGEVVMASKR register 1410). The AEHGEVVMASKR register 1410 stores a set of bits that identify which of the bits of the GEV will cause AEH by the XB 1310. The XB 1310 performs AEH in response to determining that a bit is set in GEV to indicate an event of a particular event class has occurred, in the case that AEHGEVVMASKR register 1410 stores a bit indicating that AEH is enabled for that class.

In performing AEH, the XB 1310 stops the sending of packets to the interface 1320 from the tiles 4 and stops the sending of packets to the tiles 4 from the interface 1320. If the XB 1310 receives packets from the tiles 4, the XB 1310 causes these packets to be dropped. Likewise, if the XB 1310 receives packets from the interface 1320, the XB 1310 causes these packets to be dropped. The XB 1310, in this way, blocks communication between the tiles 4 and external devices. The result is that the data plane traffic is rapidly quiesced.

The type of event indicated in the GEV that may cause the XBs 1310 to be block the traffic is an error event that is fatal to the execution of the application, e.g. an unrepairable memory error, or one of the external links of the chip 1300 being brought down. In this case, the 10 traffic is quiesced in advance of reset of the chip 1300.

Different components in the system may comprise different mask registers, such as register 1410, that indicate for each component, which of events the respective component is configured to perform actions in response to. The mask register in a particular component may comprise a first set of indications, indicating for which of the event classes identified in the CEV, the component is configured to take action in response to. The mask register may also comprise a second set of indications, indicating for which of the event classes identified in the GEV, the component is configured to take action in response to. These registers are defined on a per component basis, such that each component may perform take action (i.e. perform AEH) in response to different types of events.

Each of the event classes defined in the CEV (and by extension the GEV also) has an associated event handler that is configured to implement a given response to the occurrence of that event. The event handler is a software module running on an event handler device. The action taken by the handling device is in addition to any AEH performed by individual components 770 of the processing node 510. For example, in response to an event occurring that represents a fatal application error, the handling entity may cause the application to be reset from checkpoint.

The handling entity is different for different event classes. For some event classes, the handling entity may be software running on the MCPU 310. For other event classes, the handling entity may be a host process running on the host 320/440. Each of the event handlers in the overall system is associated with one or more of the processing nodes 510 and is configured to take action with respect to its associated one or more of the processing nodes 510 in response to event notification received from the associated one or more of the processing nodes 510.

Figure 15:
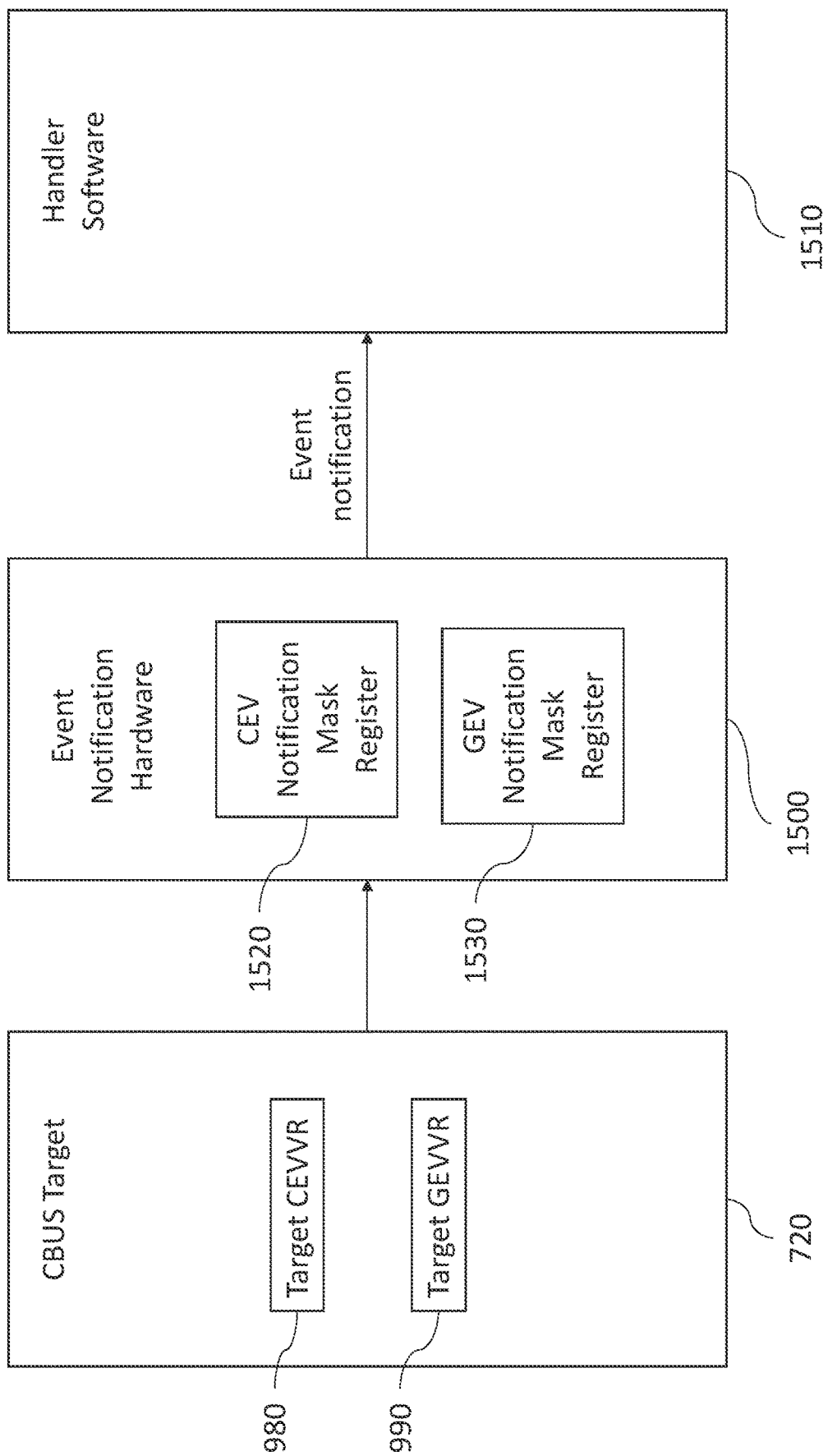
FIG. 15 illustrates an example of how event notification hardware is used to notify handler software of the occurrence of an event.

Reference is made to FIG. 15, which illustrates how event notification to an event handler 1510 may be performed. The target node 720 receives the updates to the CEV and the GEV that are broadcast by the regulator node 720 following occurrence of an event. Some of the components 770 associated with a target node 720 comprises associated event notification hardware 1500. Components include such event notification hardware 1500 comprise, for example, the PCIe complex 370/450 or the MCPU 310. The handler software 1510 may run on the same device (e.g. the MCPU 310) that comprises the event notification hardware 1500 or may run on a separate device (e.g. the host device).

The event notification hardware 1500 comprises a CEV notification mask register 1520. The CEV notification mask register 1520 indicates, for each of the event classes for which events are logged in the CEV, event notifications are to be provided to the handler software 1510. In response to receipt from the target node 720 that an event has occurred in a particular event class, processing circuitry of the event notification hardware 1500 checks the corresponding indicating in the register 1520 for that event class. If the register 1520 indicates that the events in that class are to be reported to handler software 1510, processing circuitry of the event notification hardware 1500 issues an event notification to the handler software 1510. The event notification may take the form of an interrupt to the handler software 1510.

The event notification hardware 1500 also comprises a GEV notification mask register 1530. The GEV notification mask register 1530 indicates, for each of the event classes for which events are logged in the GEV, event notifications are to be provided to the handler software 1510. In response to receipt from the target node 720 that an event has occurred in a particular event class, processing circuitry of the event notification hardware 1500 checks the corresponding indicating in the register 1530 for that event class. If the register 1530 indicates that the events in that class are to be reported to handler software 1510, processing circuitry of the event notification hardware 1500 issues an event notification to the handler software 1510. The event notification may take the form of an interrupt to the handler software 1510.

For each of the event classes reported in the CEV, one event hander is defined for handling events of that class. Similarly, for each of the event classes reported in the GEV, one event hander is defined for handling events of that class. In embodiments, each processing node 510 is associated with four event handlers: two host processes running on the host device 320/440, a process running on the MCPU 310, and a process running on an additional hardware unit for enabling cryptographic functions (referred to as the ICU). The event handlers may therefore be implemented on separate devices (e.g. the MCPU and host) or may take the form of separate processes running on the same device (e.g. separate host processes running on a single host).

In response to receipt of an event notification, the handler software 1510 is configured to take appropriate action. These actions include issuing a read request to read the event data registers 1020 in the associated regulator node 740. The event handler 1510 reads the EDR register 1020 for the relevant event class. The event handler reads the event flag and the event identifier from that EDR register 1020. The read may be issued by the event hander using an associated initiator 730 for that event handler, with the event details (e.g. the event flat and event identifier) being returned to the event handler 1510.

In the case of a global event notified to the handler software on the basis of the GEV, the event flag indicates to the event handler 1510 whether or not the event is associated with the processing node 510 with which that event handler 1510 is associated.

Figure 16:
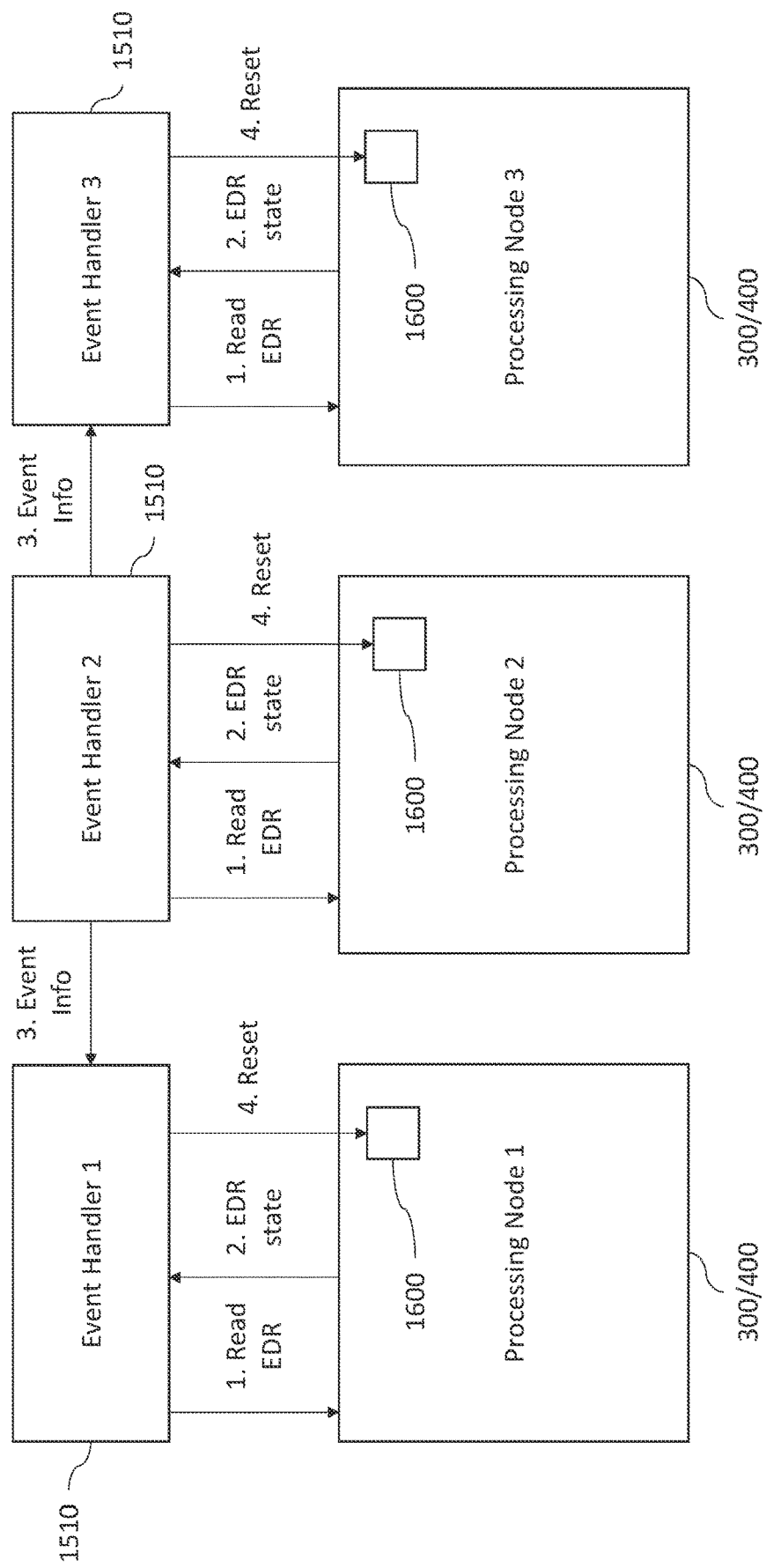
FIG. 16 illustrates how multiple event handlers in the system may respond to notification of an event that has occurred in the system.

Reference is made to FIG. 16, which illustrates the exchange of messages performed following the issuance of event notifications to an event handler 1510 on the basis of the GEV held in each of the processing nodes 510. Although each event handler 1510 is shown as being separate to its associated processing node 510, each event handler 1510 may be considered to be part of its associated processing node 510. Additionally, although each event handler 1510 is shown having a single associated processing node 510, in some embodiments, each of the event handlers 1510 is associated with multiple such processing nodes 510.

As a first step, each event handler 1510, in response to receipt of an event notification, issues a read request to read the event data register 1020 associated with the event class identified by the event notification. The event data register 1020 that is read by each event handler 1510 belongs to the processing node 510 with which the event handler 1510 is associated.

As a second step, each event handler 1510, receives in response, the state held in the EDR 1020 that was identified by the read request it sent. This state includes the event flag and event identifier held in that EDR 1020. If the event reflected in the GEV occurred in the processing node 510 with which an event handler 1510 is associated, the event flag will be set in the state to indicate that the event occurred on that node 510. In the example, shown in FIG. 16, the event reflected in the GEV occurred on processing node 2 and, therefore, event handler 2 receives an event flag set to indicate an event occurred on node 2 and additionally receives the details for that event (e.g. in the form of the event identifier).

As a third step, the event handler 2 propagates messages in relation to the event to the other event handlers 1 and 3. The messages may be the event details received by event handler 2 in the EDR state or may be messages to cause the event handlers 1 and 3 to reset their associated processing nodes 510. In the example shown, each of the event handlers 1510 determines to reset its associated processing node 510. This determination is made based on the EDR state obtained from processing node 2. The determination may be made by the event handler 2, which then propagates a command to the other event handlers 1 and 3, or may be made by each event handler 1510 individually on the basis of the EDR state obtained and distributed by event handler 2.

In this example, and as a fourth step, it is shown that each of the event handlers 1510 issues a command to reset its associated processing node 510. This reset is achieved by asserting a signal to a reset pin 1600 on the processing node 510. Circuitry on each processing node 510 causes the reset to be performed.

The reset, which may be referred to as a software reset, resets the state of a plurality of components that are part of each processing node 510. The reset has the effect of wiping the memory of the tiles 4 to remove the application data. The reset also has the effect of wiping the state of cryptographic hardware used to encrypt communications in and out of the device 510. The reset causes the state for the logical links and the connections using those links to be reset. However, the reset does not take the link down, and all state to configure the physical link is unmodified. Therefore there is no need to reprogram the EPCs 470 after the reset. The reset does not wipe the application state of the MCPU 310.

The reset has the effect of causing the CEVs and GEVs held in the components of the system to be cleared, such that they do not indicate that any events have occurred. The clearing of the CEVs and GEVs is performed by the regulator 720, which has write permissions to the CEVVRs and GEVVRs in its processing node 510.

Once a particular processing node 510 has reset its state and tile memory has been wiped, that processing node 510 may restart its application from an application checkpoint. Each processing device 300/410 has access to an external memory in which checkpoint data is periodically stored. The tiles 4 of the processing unit, following the read request, load from the external memory the checkpoint data, enabling the application to be restarted from an earlier point.

Each of the event handlers 1510 is configured to cause its associated processing node 510 to be reset immediately without requiring synchronization of the reset across the system. One problem that may be encountered when performing a reset without synchronization is that one of the processing nodes 510 may perform its reset and restart from an earlier checkpoint, whilst a further processing node 510 has not yet undergone reset continues to execute an earlier version of the application. In this case, if the processing node 510 that has not yet undergone reset, sends data packets containing application data corresponding to an earlier version, these data packets may be received by a processing unit 2 that has reset from the checkpoint. In this case, erroneous results may occur in the processing by the processing unit 2 that has restarted from the checkpoint, since the processing unit 2 is receiving data corresponding to an earlier application version.

According to embodiments, a number (referred to as the generation number) is included in the frames sent between different processing nodes 510, where that number is updated in response to each reset event. The number, therefore, indicates how many times the application has been reset.

When data frames are sent by one processing node 510 to another, the sending node 510 includes in each of those frames its own copy of the generation number. The number is checked at the recipient node 510 against the recipient's own copy of the generation number. The recipient node 510 discards the frames if the generation number in the frames does not match the generation number held by the recipient node 510. In this way, when the recipient node 510 has already reset and restored from checkpoint, the recipient node is protected against frames relating to pre-reset generation of the application, which may dispatched by other nodes in the system that have not yet undergone reset.

Figure 17:
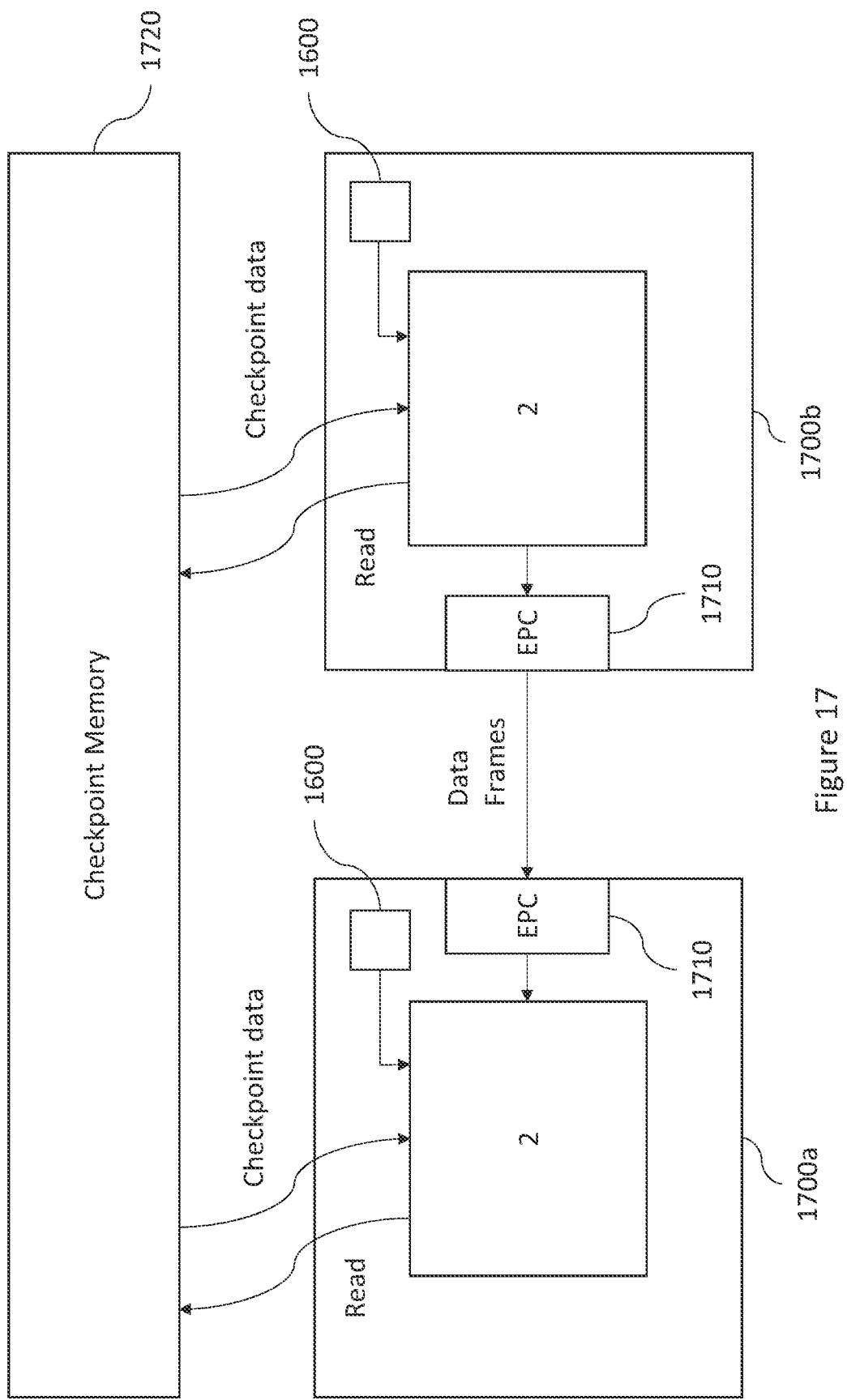
FIG. 17 illustrates how checkpoint data is read from a checkpoint memory and returned to the processing unit.

Reference is made to FIG. 17, which illustrates an example in which two processing nodes 1700a,b may communicate. Each of the nodes 1700a,b may be one of the nodes 510 described above. Typically, the system would comprise more than two processing nodes, but for simplification only two such nodes are shown in FIG. 17. Both of the processing nodes 1700a,b are configured to reset and restart from a checkpoint. The reset of both of the processing nodes 1700a,b is part of a reset and restore from checkpoint of the entire system. This reset may be performed in the manner described above with respect to FIG. 16, in which the global reset of the system, and hence the individual reset of each of the nodes 510 is performed in response to an error event that has occurred on one of the nodes 510. However, the global reset of the nodes 1700a,b may not be synchronised, meaning that one of the nodes 1700a,b may proceed to reset and restore from checkpoint before the other of the nodes 1700a,b has been quiesced. In this case, the node 1700a,b that has not yet been quiesced may send data frames to the one of the nodes 1700a,b that has restored from checkpoint. The copies of the generation number protect against disruption to the application processing on the restored node.

Figure 18A:
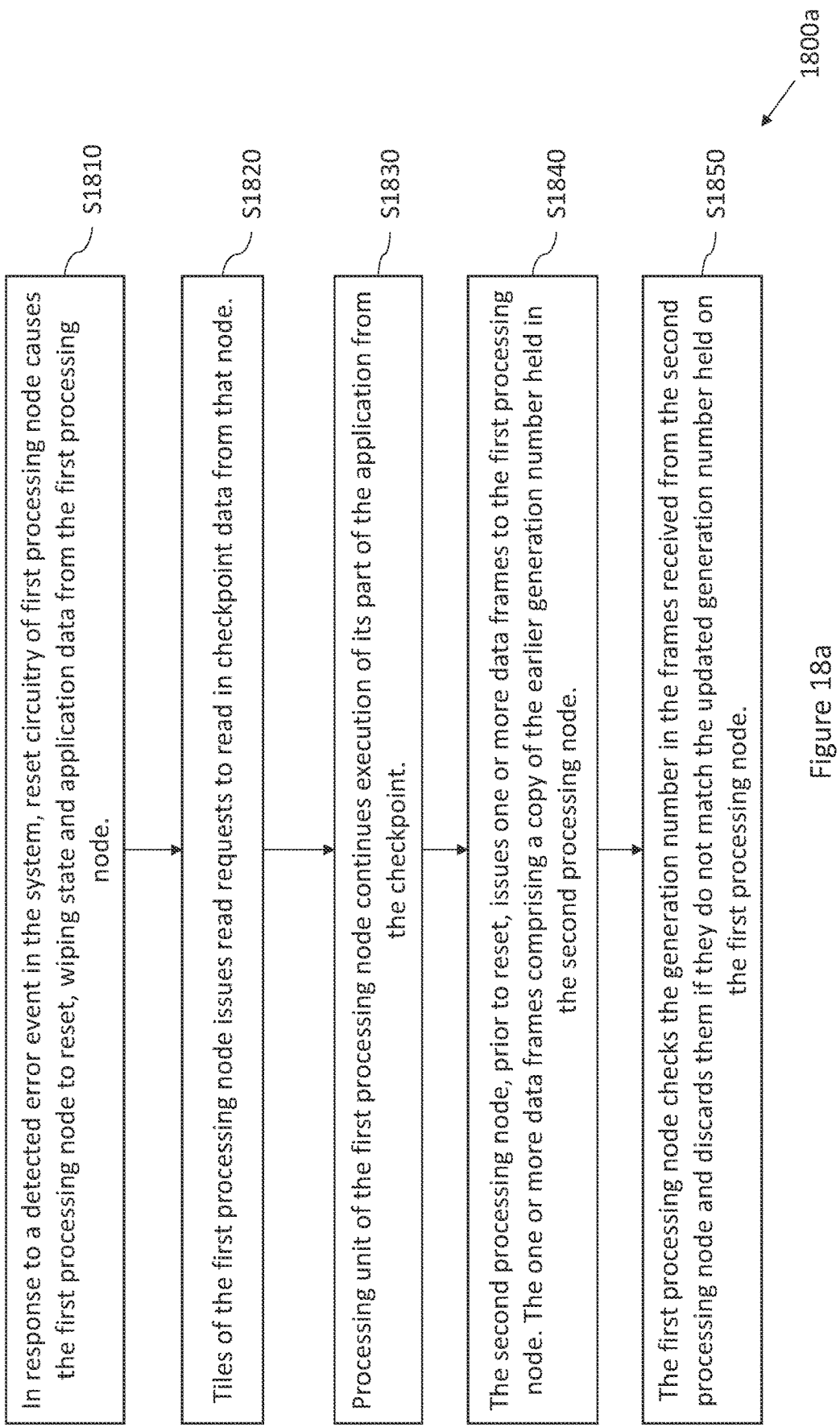
FIG. 18a illustrates the first part of a method for performing a reset of the multi-node system.
Figure 18B:
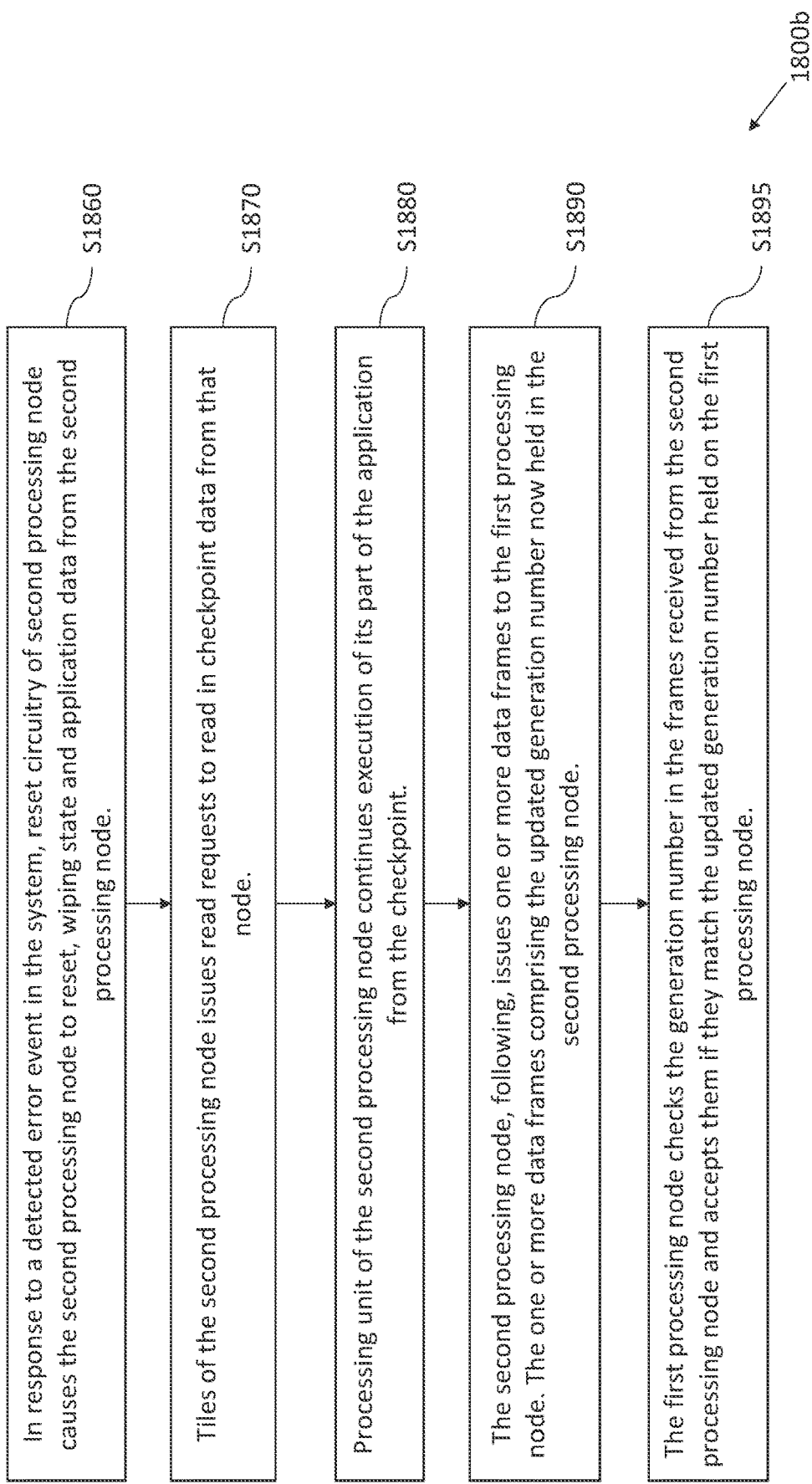
FIG. 18b illustrates the second part of a method for performing a reset of the multi-node system.

Reference is made to FIGS. 18a and 18b, which illustrates a sequence of events performed by the system of processing nodes 1700a,b shown in FIG. 17. The overall method is shown divided into a first part 1800a (shown in FIG. 18a) and a second part (shown in FIG. 18b). At the start of the sequence of events, both of the processing nodes 1700a,b store identical copies of the generation number. The generation number reflects a number of times a global reset (including a reset across both nodes 1700a,b) of the system has been performed. Since the generation number is the same, the nodes 1700a,b may communicate, since frames issued by one node will contain the same generation number as is stored on the other node 1700a,b and hence will be accepted by that other node 1700a,b.

At S1810, in response to a detected error event, reset circuitry 1600 of the first processing node 1700a causes the first processing node 1700a to be reset. As part of this reset, the state is erased from various components of the node 1700a. The memory of tiles 4 is wiped by circuitry of a hardware module of the node 1700a, which causes zeros to be written to that memory. As part of the reset, a copy of the generation number held in storage in the node 1700a is updated. As will be described, the generation number may be held in storage in the interface 1710. The generation number is updated by being incremented to a new value.

At S1820, following the reset of the processing node 1700a, the part of the application that the processing node 1700a is responsible for is restored from checkpoint. In order to achieve this, a bootloader program is provided from a hardware module of the node 1700a to different ones of the tiles 4. The tiles 4 execute the bootloader program to issue read requests to a checkpoint memory 1720. The checkpoint memory 1720 is shown as a single memory unit, but may comprise multiple memory units for different nodes 1700a, b. In response to the read requests issued by the tiles 4 of node 1700a, application instructions and application data for the checkpoint is returned to those tiles 4 from memory 1720. The application data returned to node 1700a represents the state of the part of the application executing on the processing unit 2 of that node 1700a that was written out of that processing unit 2 at the last checkpoint.

At S1830, the tiles 4 of the processing unit 2 of the node 1700a continue executing application instructions from the checkpoint. At the same time, the second processing node 1700b has not yet undergone reset and the processing unit 2 of that node 1700b is performing processing of its part of the application corresponding to an earlier generation. The second processing node 1700*b*, therefore, stores the earlier generation number, which was also held in storage of the first processing node 1700*a*, prior to the reset at S1810.

At S1840, the tiles 4 of the processing unit 2 of the node 1700*b* are configured to cause the issuance one or more data frames to the first processing node 1700*a*. The one or more data frames each comprise a copy of the earlier generation number held in storage of the node 1700*b*. The tiles 4 cause the data frames to be issued by issuing data packets to an EPC of the respective processing node 1700*b*, which causes the data packets to be encapsulated into data frames and sent to the node 1700*a*.

At S1850, the first processing node 1700*a* receives the data frames sent at S1840. Circuity of the first processing node 1700*a* checks the generation number in each of the data frames and compares this to the copy of the generation number held in the storage of the processing node 1700*a*. Since these two generation numbers do not match, the circuitry of the processing node 1700*a* discards the frames. As will be described, the checking and discarding of the frames may be performed by the interface 1710 of the first processing node 1700*a*.

At S1860, the second processing node 1700*b* resets. This step performed at S1860 is the same as S1810 described above, but performed by the second processing node 1700*b*, rather than the first processing node 1700*a*.

At S1870, following the reset of the processing node 1700*b*, the part of the application that the processing node 1700*b* is responsible for is restored from checkpoint. In order to achieve this, a bootloader program is provided from a hardware module of the node 1700*b* to different ones of the tiles 4. The tiles 4 execute the bootloader program to issue read requests to a checkpoint memory 1720. In response to the read requests issued by the tiles 4 of node 1700*b*, application instructions and application data for the checkpoint is returned to those tiles 4 from memory 1720. The application data returned to node 1700*b* represents the state of the part of the application executing on the processing unit 2 of that node 1700*b* that was written out of that processing unit 2 at the last checkpoint.

At S1880, the processing unit 2 of the second processing node 1700*b* continues execution of its part of the application from the checkpoint.

At S1890, the tiles 4 of the processing unit 2 of the node 1700*b* are configured to cause issuance of a further one or more data frames to the first processing node 1700*a*. The tiles 4 cause these further data frames to be issued by issuing data packets to an EPC of the respective processing node 1700*b*, which causes the data packets to be encapsulated into data frames and sent to the node 1700*a*. Unlike the frames sent at S1840, these further one or more data frames each comprise a copy of the updated version of the generation number, which is now held in the storage of both nodes 1700*a,b*.

At S1895, first processing node 1700*a* receives the data frames sent at S1890. Circuity of the first processing node 1700*a* checks the generation number in each of the data frames and compares this to the copy of the generation number held in the storage of the processing node 1700*a*. Since these two generation numbers match, the circuitry of the processing node 1700*a* accepts the frames. The data from these frames is written to tile 4 memory.

The generation number may be inserted at different points in the data frames sent between the nodes 1700*a*, 1700*b*. The generation number may be inserted in a packet header (e.g. an Elink packet header) that is dispatched by a tile 4. Alternatively, the generation number may be inserted in a payload of the packet.

Figure 19:
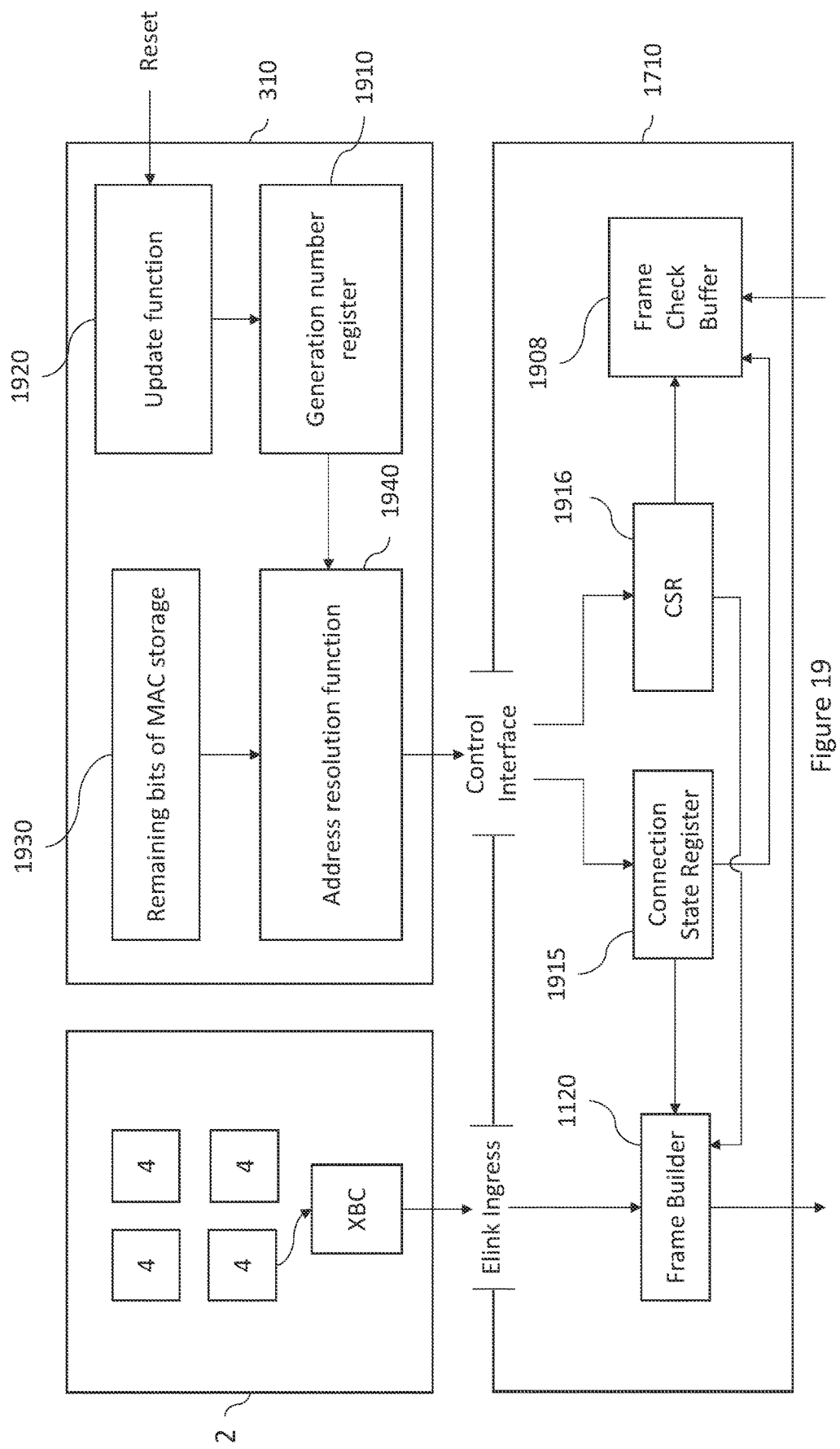
FIG. 19 illustrates how a generation number used for a connection may be updated in response to a reset event.

Reference is made to FIG. 19, which illustrates an example embodiment in which the generation number is included within the MAC addresses of the frame headers. In the embodiment, the MCPU 310 is responsible for providing MAC addresses for use in sending data over a connection. As part of the MAC addresses, the MCPU 310 provides the generation number. The MAC addresses (including the MAC address of the interface 1710 and the MAC address of the other interface 1710) for the connection are provided by the MCPU 310 to the connection state register 1915 and the control and status register (CSR) 1916 for storage in those registers 1915, 1916. Specifically, the register 1915 stores the MAC of the destination interface 1710 to which the frames are dispatched, whilst the CSR 1916 stores the MAC of the interface 1710 that sends the frames. In each of these MAC addresses, one or more bits are reserved for including as a generation number in the data frames.

When a tile 4 has data to send, the tile 4 dispatches this data to the interface 1710 in the form of one or more data packets (e.g. Elink packets). The frame builder 1120 encapsulates the data packets into data frames by adding the frame headers and frame tail. In this way, the data packets issued by the processing unit 2 may be tunnelled over Ethernet. The frame builder 1120 inserts the MAC held in the connection state register 1915 as the destination MAC for each frame. The frame builder 1120 inserts the MAC held in the connection state register 1915 as the source MAC for each frame.

On the receive side, a frame check buffer 1908 is provided that receives data frames from the other interface 1710 belonging to the other node. Circuitry of the interface 1710 shown in FIG. 19 checks the destination MAC in the received frames against the MAC held in the CSR 1916. If there is a mismatch between these MACs, the circuitry causes the frames to be dropped. If this is a match between the MACs, the circuitry causes the data packets encapsulated in those frames to be forwarded to the tiles 4 of the processing unit 2 that are identified in the packet header.

The MCPU 310 comprises at least one processor executing instructions to provide the update function 1920 and the address resolution function 1940 shown. The address resolution function is configured to provide the MAC addresses for the connection, which are provided to the interface 1710. The MAC addresses are local scope MAC addresses and so may be updated by software, rather than fixed at all times for a particular interface 1710. The address resolution function 1940 inserts into each MAC address, the current generation number held in generation number register 1910. The remaining parts of the MAC address may be obtained from storage 1930 or be determined by the function 1940 in another suitable way.

The MCPU 404 updates MACs for a connection in a response to a reset event. The MCPU 404 comprises the generation number register 1210, which stores the current generation number, which is provided as part of each MAC address output by the address resolution function 1240. The processing circuitry of the MCPU 404 supports an update function 1220 that updates the generation number held in the generation number register 1210.

When a reset (e.g. the resets occurring in S1810 and S1860) of the processing node which the MCPU 310 belongs to is performed, the indication of this reset is delivered to the MCPU 310. The update function 1920 responds to this reset event by updating the value of the generation number held in the generation number register 1910. The update of the generation number held in the generation number register 1910 may comprise incrementing the current value of the generation number by one. For example, suppose that the generation number consists of five bits, with the current value of the generation number held in the register 1910 being given by the bit sequence: 00001. In response to a reset event, the update function 1920 updates the generation number by increasing the value by one to: 00010.

Since the generation number comprises a finite number of bits, in the case that the current value of the generation is equal to the maximum possible value, the updating of the generation number comprises resetting the generation number to the lowest possible value. For example, suppose that the generation number consists of five bits, with the current value of the generation number held in the register 1210 being given by the bit sequence: 11111. In response to a reset event, the update function 1220 resets the generation number to the lowest possible value given by: 00000. Therefore, the generation number is updated by the update function 1920 in a wraparound manner.

In response to the indication of the reset event, the address resolution function 1940 determines updated MAC addresses for the connections participated in by the device 400. As noted, one or more bits are reserved in each MAC address for representing the generation number. The address resolution function 1240 sets these bits to the value of the new generation number stored in the register 1910 by the update function. The remaining bits in each MAC address are set to the same values as before the reset event.

For each MAC address, the remaining bits of that MAC address may be determined in different ways. In some embodiments, these bits may be held in a storage 1930 accessible to the address resolution function 1240 and concatenated with the bits of the new generation number to form a full MAC address. These bits held in the storage 1930 are not wiped in response to the reset event, but persist and do not change following the reset event. In this embodiment, the storage 1930 stores the remaining bits (i.e. those bits other than the bits of the generation number) for each of the MAC addresses for which the address resolution function 1940 is responsible for determining. The address resolution function 1940 provides each of these MACs by combining the same generation number with the remaining bits for the respective MAC.

As noted, the application state for a first processing node 1700a may be restored from a checkpoint prior to the application state of other ones of the processing nodes (e.g. node 1700b) also being restored from. In this case, the first processing node 1700a may continue its application processing, even whilst processing node 1700b has not yet reset and comprises application state corresponding to a previous generation of the application. This may be enabled via the use of barrier synchronizations, which separate a compute phase for participating processing units 2 from an exchange phase for those processing units 2. Barrier synchronizations are inserted into the compiled code running on each of the processing units 2. For each of the barrier synchronizations one or more processing units 2 is configured to participate.

The use of barrier synchronizations prevents the first processing unit 2 of the node 1700a from running ahead of a point in its code, beyond which it would need to exchange data with a processing unit 2 that has not yet undergone restore and restart from a checkpoint. For example, suppose the processing unit 2 of the node 1700a, following the checkpoint, enters a compute phase in which it performs computations on data to generate results. The processing unit 2 of node 1700a does not exchange data with the processing unit 2 of node 1700b until it reaches a barrier synchronization in which both processing units 2 of nodes 1700a, 1700b participate. Upon reaching this barrier synchronization, the processing unit 2 of node 1700a stalls until the processing unit 2 of node 1700b also reaches the barrier synchronization. In this way, even if the processing unit 2 of node 1700a reaches the barrier synchronization, whilst node 1700b has not yet been reset, the processing unit 2 of node 1700a will wait until the node 1700b resets and its processing unit 2 reaches the barrier, before moving on to the exchange phase following the barrier synchronization. During the exchange phase, the processing unit 2 of node 1700a sends any application data scheduled for sending during that exchange phase to the processing unit 2 of node 1700b.

The use of barrier synchronizations prevents processing units 2 of the system 500 from running ahead and sending data to any processing units 2 of the system 500 that have not yet reset. The use of barrier synchronizations in the context of the processing units 2 is described in more detail in our earlier U.S. application Ser. No. 17/446,681, which is incorporated by reference.

It has been described how, in response to a reset event, the copies of the CEV and GEV are cleared from the processing nodes (i.e. reset to indicate no events). Bits of the CEV may also be reset by the event handler for an event class. Resetting bits of the CEV enables another event within the event class enables to be detected and handled.

Referring again to FIG. 10, the regulator node 740 comprises a plurality of registers 1040, referred to herein as event handler registration registers 1040. The registers 1040 comprise an event handler registration register for each of the different event handlers for the processing node 510. For example, there may be an event handler registration register for each of the two host processors, one of the MCPU 310 and one for the ICU. Each of the event handler registration registers 1040 comprises an indication for each event class captured in the CEV, whether or not the respective event handler associated that register has permission to clear the state for that event class.

When an event handler 1510 has received an event notification, the event handler 1510 may, amongst other things, determine to clear the event state for that event, such that any further occurrences of events in the same event class may be detected. To clear the event state for an event class, the event handler 1510 issues a request via the control bus 700 to the regulator node 740, where that request is a request to clear the EDR for that event class. The request includes an identifier of the relevant event handler 1510 and an identifier of the event class. The regulator node 740 examines the permission indication for that event class in the event handler registration register 1040 for that event handler 1510. If the event handler 1510 has permission to clear the event state for that event class, the regulator node 740 updates the EDR for that event class to reset the EDR to its default state. In this state, the EDR indicates that no event has been detected. Additionally, the regulator node 740 updates the master CEVVR 1030 to reset the event indication for this event class. The regulator node 740 broadcasts a write request to also update the copies of the CEV held in the target nodes 720 of the processing node 510 so to also reset the event indication in the same way.

Figure 20:
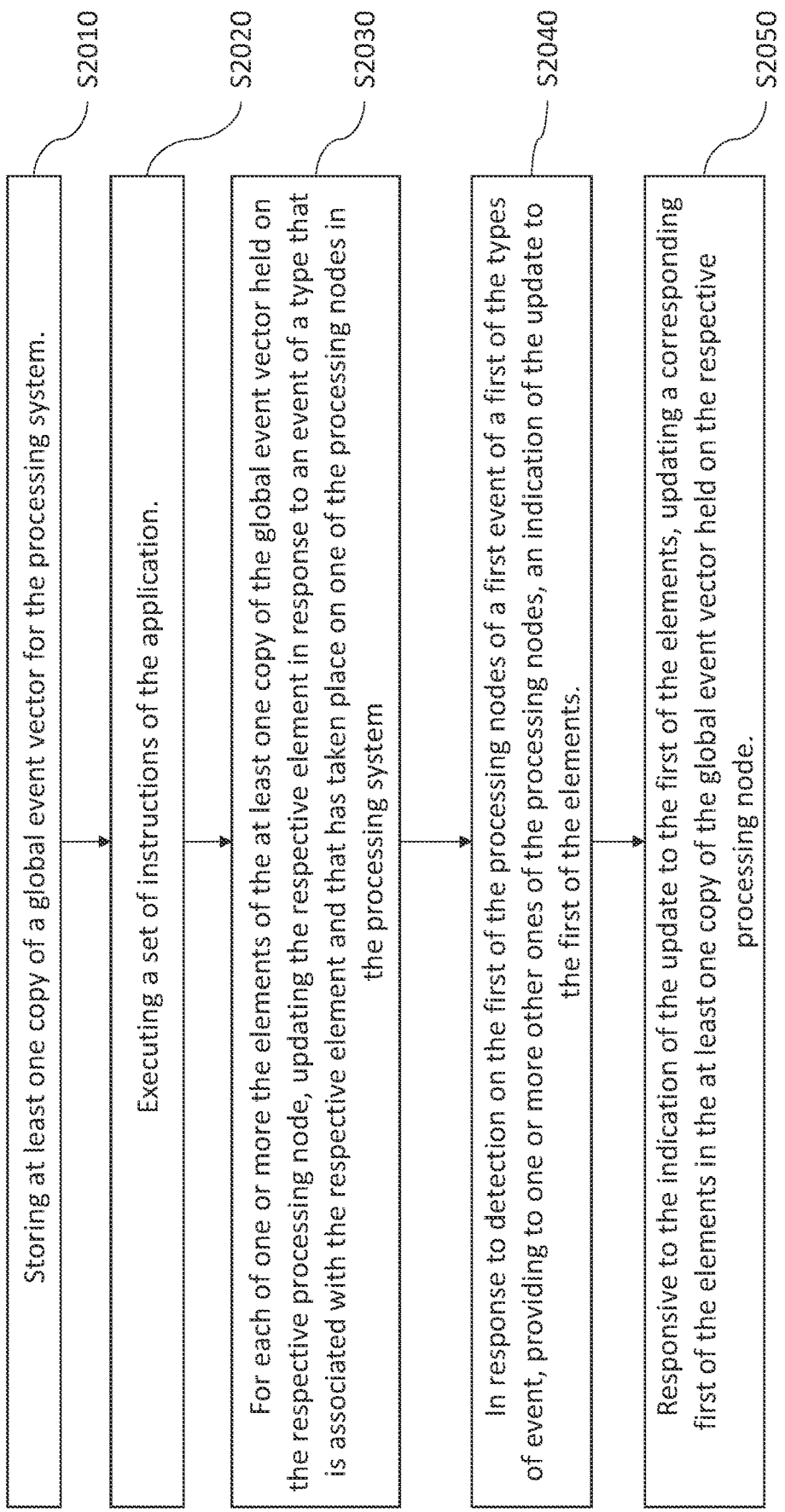
FIG. 20 illustrates an example of a method for propagating global event state between different nodes of the multi-node system.

Reference is made to FIG. 20, which illustrates an example method 2000 for aggregating global event state between processing nodes 510. One or more of these steps may overlap with one another.

S2010 is performed by each node 510 in the system 500. At S2010, each processing node 510 in the system 510 stores a copy of the global event vector for the processing system 500. Initially, this vector is set to indicate no events have occurred in the system 500. The global event vector is held in the master GEVVR 1010 and in the GEVVRs 990 of the target nodes.

S2020 is performed by each node 510 in the system 500. At S2020, each processing unit 2 in the system 500 executes a set of instructions of the distributed application.

S2030 is performed by each node 510 in the system 500. At S2030, each of the processing nodes 510, updates each of one or more the elements of the at least one copy of the global event vector in response to an event of a type that is associated with the respective element and that has taken place on one of the processing nodes in the processing system. This step is performed by the regulator 740.

At 52040, on a first of the processing nodes 510, a first event of a first of the types of event is detected. This event may, for example, be the event detected by component 770a of node 510a. In response to detection of the first event, the first of the processing nodes 510 provides to one or more other ones of the processing nodes 510, an indication of the update to a first of the elements of the global event vector. The first of the elements is associated with the first of the types of event.

S2050 is performed by other nodes 510 (i.e. other than the first of the nodes 510) in the system 500 that receive the update provided by the first of the processing nodes 510 at 52040. At S2050, each of these other nodes 510, responsive to the indication of the update to the first of the elements, updates a corresponding first of the elements in its at least one copy of the global event vector.

Figure 21:
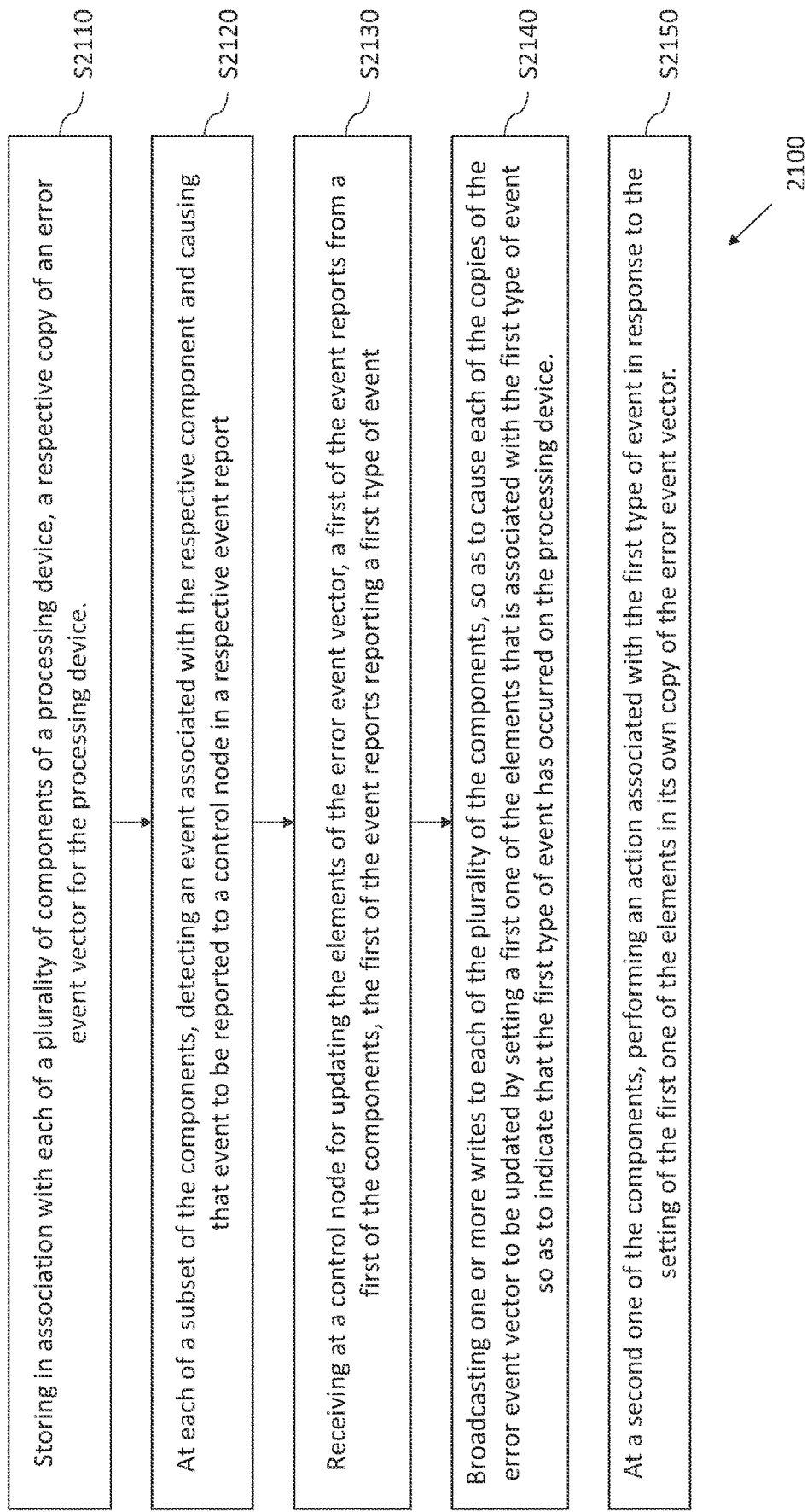
FIG. 21 illustrates an example of a method for propagating local event state to components to enable those components to engage in perform relevant actions in response.

Reference is made to FIG. 21, which illustrates an example method 2100 for updating copies of an event vector held on the device and using these copies to perform a responsive action. The error event vector may be the CEV or GEV discussed above. The device may be the device 300 or device 410.

At 52110, a copy of the event vector is stored for each of the components 770 in the device 300. Initially, each copy of the event vector may be set to indicate that no events in any of the event classes captured in the event vector have occurred.

At 52120, at each of a subset of the components 770, an event associated that component 770 is detected. The event is reported to the control node 740 in a respective event report. The subset of the components 770 comprises one or more components 770.

At 52130, the control node 740 receives a first of the event reports from a first of the components 770, the first of the event reports reporting a first type of event, where an event of that first type has been detected by the first of the components 770.

At 52140, the control node 740 broadcasts one or more writes to each of the plurality of the components 770, so as to cause each of the copies of the error event vector to be updated by setting a first one of the elements that is associated with the first type of event so as to indicate that the first type of event has occurred on the processing device. These copies are held in the CEVVRs 980 of the target nodes 720.

At 52150, at a second one of the components 770, an action associated with the first type of event is performed in response to the setting of the first one of the elements in its own copy of the error event vector.

Various functions are described above as being performed by circuitry, e.g. processing logic 930, processing circuitry 1010, processing circuitry 1220, processing circuitry 1400, circuitry 1600. This circuitry may comprise dedicated hardware, e.g. FPGAs or ASICs, and/or processors configured to execute instructions. Each processing node 510 in the system 500 is allocated a set of instructions for performing any of the operations performed by processors configured to executed instructions.

The above embodiments have been described by way of example only.

The invention claimed is:

1. A processing system configured to support an application, the processing system comprising:
   a plurality of processing nodes, each of which comprises:
      a processing unit configured to execute a set of instructions for a part of the application; and
      at least one storage configured to store a copy of a number indicating a number of times a global reset of the processing system has been performed; and
      reset circuitry configured to cause:
         a respective processing node to be reset as part of one of the global resets for the processing system; and
         application state for the part of the application for the respective processing node to be restored from a checkpoint,
   wherein each of the processing nodes comprises update circuitry configured to, as part of the reset of the respective processing node, update the copy of the number held in the at least one storage of the respective processing node from a first value to a second value,
   wherein the processing unit of a second of the processing nodes is configured to, prior to the reset of the second of the processing nodes, execute its sets of instructions to cause the sending of one or more data frames to a first of the processing nodes, each of the one or more data frames comprising the first value of the number,
   wherein circuitry of the first of the processing nodes is configured to, following the reset of the first of the processing nodes, and in response to determining a mismatch between the first value of the number in the one or more data frames and the second value of the number held in the at least one storage of the first of the processing nodes, cause data in the one or more data frames to be discarded, and
   wherein the processing unit of the first of the processing nodes is configured to, following the reset of the first of the processing nodes, stall at a first barrier synchronization until a further one of the processing units, which is also arranged to participate in the first barrier synchronization, reaches the first barrier synchronization in its application processing.

2. The processing system of claim 1, wherein for each of the processing nodes, the respective processing unit is configured to participate in a plurality of barrier synchronizations indicated in its set of instructions,
   wherein for each of the processing nodes, the respective processing unit is configured to, for each of the barrier synchronizations in which it participates, pass the respective barrier synchronization in response to at least one further one of the processing units in the processing system also participating in the respective barrier synchronization.

3. The processing system of claim 2, wherein for each of the processing nodes, each of the respective plurality of barrier synchronizations separates a compute phase of the respective processing unit from an exchange phase of the respective processing unit.

4. The processing system of claim 1, wherein the further one of the processing units is the processing unit of the second of the processing nodes.

5. The processing system of claim 1, wherein the first barrier synchronization acts as barrier between a compute phase and an exchange phase, wherein the processing unit of the first of the processing nodes is configured to execute its set of application instructions to:
perform computations during the compute phase until reaching the first barrier synchronization; and
following the first barrier synchronization, exchange data with the second of the processing nodes during the exchange phase, the exchanged data including data contained in the one or more data frames.

6. The processing system of claim 1, wherein the circuitry of the first of the processing nodes that is configured to determine the mismatch is part of an interface of the first of the processing nodes for interfacing with the second of the processing nodes.

7. The processing system of claim 6, wherein the interface of the first of the processing nodes is configured to receive further data frames from the second of the processing nodes and, provide data packets encapsulated in the further data frames to the processing unit of the first of the processing nodes.

8. The processing system of claim 1, wherein the processing unit of the second of the processing nodes is configured to, following the reset of the second of the processing nodes, execute its sets of instructions to cause the sending of one or more further data frames to the first of the processing nodes, each of the one or more further data frames comprising the second value of the number,
wherein the circuitry of the first of the processing nodes is configured to receive the one or more further data frames and in response to determining a match between the second value of the number in each of the one or more further data frames and the second value of the number held in the at least one storage of the first of the processing nodes, cause data in the one or more data frames to be accepted.

9. The processing system of claim 1, wherein the circuitry of the first of the processing nodes is configured to determine the mismatch as part of checking an address field in each the data frames.

10. The processing system of claim 1, wherein for each of the processing nodes, the respective update circuitry comprises a processor configured to execute computer readable instructions so as to perform the update of the copy of the number held in the at least one storage of the respective processing node.

11. The processing system of claim 1, wherein the updating the copy of the number comprises incrementing the first value to obtain the second value.

12. The processing system of claim 1, wherein the copy of the number forms part of connection state for a connection between the first of the processing nodes and the second of the processing nodes.

13. The processing system of claim 1, wherein each processing node comprises an integrated circuit comprising:
the processing unit; and
the at least one storage for the respective processing node.

14. The processing system of claim 1, wherein the processing unit of the second of the processing nodes is configured to execute its set of instructions to output the first value of the number in one or more data packets of the one or more data frames.

15. The processing system of claim 1, wherein the processing unit of the second of the processing nodes is configured to execute its set of instructions to output data for the one or more data frames to interface circuitry, wherein the interface circuitry is configured to provide the one or more data frames with the first value of the number inserted into each frame.

16. A method performed in a processing system having a plurality of processing nodes, the method comprising:
executing a first set of instructions, for a first part of an application, on a first processing node of the plurality of processing nodes;
executing a second set of instructions, for a second part of the application, on a second processing node of the plurality of processing nodes;
storing on the first processing node, a first copy of a number indicating a quantity of times a global reset of the processing system has been performed;
storing a second copy of the number on the second processing node;
performing a first global reset, including:
resetting both the first processing node and the second processing node, including updating, from a first value to a second value, the first copy of the number and the second copy of the number; and
restoring application state for the first part of the application and for the second part of the application from a checkpoint;
prior to resetting the second processing node, sending a data frame from the second processing node to the first processing node, the data frame comprising the first value of the number;
following resetting the first processing node, and in response to determining a mismatch between the first value of the number in the data frame and the second value of the number stored at the first processing node, causing data in the data frame to be discarded; and
following resetting the first processing node, stall at a first barrier synchronization until the second processing node, which is also participating in the first barrier synchronization, reaches the first barrier synchronization in its application processing.

17. A non-transitory computer readable medium storing a computer program comprising a set of executable instructions for each processing node of a plurality of processing nodes forming a data processing system, including a first set of executable instructions, for a first part of an application, on a first processing node of the plurality of processing nodes and a second set of executable instructions, for a second part of the application, on a second processing node of the plurality of processing nodes;
wherein the first set of executable instructions, when executed by a first processor of the first processing node, causes the first processing node to:
store on the first processing node, a first copy of a number indicating a quantity of times a global reset of the data processing system has been performed;
during a first global reset, reset the first processing node, including updating, from a first value to a second value, the first copy of the number; and
restore application state for the first part of the application from a checkpoint;

wherein the second set of executable instructions, when executed by a second processor of the second processing node, causes the second processing node to:
store a second copy of the number on the second processing node;
during the first global reset, reset the second processing node, including updating, from the first value to the second value, the second copy of the number; and
restore application state for the second part of the application from the checkpoint;
wherein the second set of executable instructions, when executed by the second processor of the second processing node, further causes the second processing node to: prior to resetting the second processing node, send a data frame from the second processing node to the first processing node, the data frame comprising the first value of the number; and
wherein the first set of executable instructions, when executed by the first processor of the first processing node, further causes the first processing node to:
following resetting the first processing node, and in response to determining a mismatch between the first value of the number in the data frame and the second value of the number stored at the first processing node, cause data in the data frame to be discarded; and
following resetting the first processing node, stall at a first barrier synchronization until the second processing node, which is also participating in the first barrier synchronization, reaches the first barrier synchronization in its application processing.

18. The non-transitory computer readable medium of claim 17,
wherein the second set of executable instructions, when executed by the second processor of the second processing node, further causes the second processing node to: following resetting the second processing node, send a second data frame to the first processing node, the second data frame comprising the second value of the number; and
wherein the first set of executable instructions, when executed by the first processor of the first processing node, further causes the first processing node to: receive the second data frame and in response to determining a match between the second value of the number in the second data frame and the second value of the number stored at the first processing node, cause data in the second data frame to be accepted.

* * * * *